US012534997B2

(12) United States Patent
Toussaint et al.

(10) Patent No.: US 12,534,997 B2
(45) Date of Patent: Jan. 27, 2026

(54) GEOTHERMAL PRODUCTION MONITORING SYSTEMS AND RELATED METHODS

(71) Applicant: Schlumberger Technology Corporation, Sugar Land, TX (US)

(72) Inventors: Charles Toussaint, Clamart (FR); You Cheng Jee, Singapore (SG); Guillaume Jolivet, Singapore (SG); Cheng-Gang Xie, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/438,535

(22) Filed: Feb. 12, 2024

(65) Prior Publication Data

US 2024/0183266 A1 Jun. 6, 2024

Related U.S. Application Data

(62) Division of application No. 17/601,131, filed as application No. PCT/US2020/026740 on Apr. 3, 2020, now Pat. No. 11,994,018.
(Continued)

(51) Int. Cl.
*E21B 47/008* (2012.01)
*E21B 43/12* (2006.01)
(Continued)

(52) U.S. Cl.
CPC .......... *E21B 47/008* (2020.05); *E21B 43/121* (2013.01); *E21B 47/07* (2020.05);
(Continued)

(58) Field of Classification Search
CPC ...... E21B 47/008; E21B 47/07; E21B 43/121; F24T 50/00; F24T 10/20; F17D 3/01; G01F 1/66; G01F 1/74
See application file for complete search history.

(56) References Cited

U.S. PATENT DOCUMENTS 49,778 A * 9/1865 Mills .................... E21B 33/122
166/189
3,757,516 A 9/1973 McCabe
(Continued)

FOREIGN PATENT DOCUMENTS

KR 101389410 B1 5/2014
KR 20140135598 A 11/2014
(Continued)

OTHER PUBLICATIONS

International Search Report and Written Opinion issued in International Patent application PCT/US2020/026740 on Jul. 16, 2020, 7 pages.
(Continued)

*Primary Examiner* — Neel Girish Patel
(74) *Attorney, Agent, or Firm* — Jeffrey D. Frantz

(57) ABSTRACT

Geothermal production monitoring systems and related methods are disclosed herein. An example system includes a production well, an injection well, a downhole pump or a downhole compressor to control a production of a multiphase fluid including steam from the production well, a first fluid conduit to transport the multiphase fluid away from the production well, a surface pump disposed downstream of the first fluid conduit, and a second fluid conduit. The surface pump is to inject water into the injection well via the second fluid conduit. A flowmeter is fluidly coupled to the first fluid conduit. The example system includes a processor to control at least one of (a) the downhole pump or the downhole compressor or (b) the surface pump in response to fluid property data generated by the first flowmeter.

5 Claims, 13 Drawing Sheets

Related U.S. Application Data

(60) Provisional application No. 62/829,436, filed on Apr. 4, 2019, provisional application No. 62/829,490, filed on Apr. 4, 2019.

(51) Int. Cl.

| | |
|---|---|
| ***E21B 47/07*** | (2012.01) |
| ***F17D 3/01*** | (2006.01) |
| ***F24T 10/20*** | (2018.01) |
| ***F24T 50/00*** | (2018.01) |
| ***G01F 1/66*** | (2022.01) |
| ***G01F 1/74*** | (2006.01) |

(52) U.S. Cl.

CPC ................ *F17D 3/01* (2013.01); *F24T 10/20* (2018.05); *F24T 50/00* (2018.05); *G01F 1/66* (2013.01); *G01F 1/74* (2013.01)

(56) References Cited

U.S. PATENT DOCUMENTS

| | | | | |
|---|---|---|---|---|
| 4,396,063 | A | 8/1983 | Godbey | |
| 5,421,209 | A | 6/1995 | Redus | |
| 5,526,646 | A | 6/1996 | Bronicki | |
| 5,671,601 | A | 9/1997 | Bronicki | |
| 7,469,188 | B2 | 12/2008 | Wee | |
| 7,673,252 | B2 | 3/2010 | Chen | |
| 9,331,547 | B2 | 5/2016 | Bronicki | |
| 9,964,498 | B2 | 5/2018 | Jean | |
| 10,060,258 | B2 | 8/2018 | Rowe | |
| 11,994,018 | B2 | 5/2024 | Toussaint | |
| 2008/0066961 | A1* | 3/2008 | Aivalis | E21B 23/14 166/384 |
| 2008/0319685 | A1 | 12/2008 | Xie | |
| 2009/0211757 | A1 | 8/2009 | Riley | |
| 2012/0048546 | A1* | 3/2012 | Ndinemenu | E21B 43/24 166/272.3 |
| 2014/0083706 | A1 | 3/2014 | Scott | |
| 2015/0134275 | A1 | 5/2015 | Chen | |
| 2015/0176382 | A1 | 6/2015 | Chakrabarty | |
| 2016/0076925 | A1 | 3/2016 | Chen | |
| 2016/0230522 | A1 | 8/2016 | Daniel | |
| 2016/0290846 | A1 | 10/2016 | Chazal | |
| 2018/0156648 | A1 | 6/2018 | Gimenez | |
| 2021/0089905 | A1* | 3/2021 | Olsen | G06N 3/08 |

FOREIGN PATENT DOCUMENTS

| | | | |
|---|---|---|---|
| WO | 2007016865 | A1 | 2/2007 |
| WO | 2012085770 | A1 | 6/2012 |
| WO | 2016048801 | A1 | 3/2016 |
| WO | 2018042201 | A1 | 3/2018 |
| WO | 2018160927 | A1 | 9/2018 |

OTHER PUBLICATIONS

Partial Supplementary Search Report issued in European Patent Application No. 20784951.4 dated Nov. 30, 2022, 11 pages.

Extended Search Report issued in European Patent Application No. 20784951.4 dated Mar. 27, 2023, 15 pages.

Ultrasonic thickness gauge retried on Apr. 8, 2019 from [https://en.wikipedia.org/wiki/Ultrasonic_thickness_gauge], last edited Mar. 12, 2019, 2 pages.

* cited by examiner

GEOTHERMAL PRODUCTION MONITORING SYSTEMS AND RELATED METHODS

RELATED APPLICATIONS

This patent application is a divisional of U.S. patent application Ser. No. 17/601,131, which was filed on Oct. 4, 2021, which is a National Stage Entry of International Application No. PCT/US2020/026740, which was filed on Apr. 3, 2020, which claims the benefit of U.S. Provisional Patent Application Ser. No. 62/829,436, which was filed on Apr. 4, 2019, and U.S. Provisional Patent Application Ser. No. 62/829,490, which was filed on Apr. 4, 2019. U.S. Provisional Patent Application Ser. Nos. 62/829,436 and 62/829,490 are hereby incorporated herein by reference in their entireties. Priority to U.S. Provisional Patent Application Ser. Nos. 62/829,436 and 62/829,490 is hereby claimed.

BACKGROUND

This disclosure relates generally to geothermal energy production and, more particularly, to geothermal production monitoring systems and related methods.

Description of the Related Art

Geothermal reservoirs produce water steam that can be captured in production fluid and used as an energy source for industrial applications. Evaluation of the quality and energy content of the steam may be based on fluid separation of the production fluid by a dedicated device such that a water vapor phase and a water liquid phase are measured separately for single phase flows. Other known methods for evaluating steam in a production fluid includes injecting phase-specific tracers of liquid and gas under steady-state conditions at known rates in the two-phase production flow. Samples of the two phases are collected downstream of the injection point of the tracers. The concentration of the tracers in each phase may be used with total flow rate measurements to determine individual phase flow rates and production enthalpy.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example system includes a production well, an injection well, a downhole pump or a downhole compressor to control a production of a multiphase fluid including steam from the production well, a first fluid conduit to transport the multiphase fluid away from the production well, a surface pump disposed downstream of the first fluid conduit, and a second fluid conduit. The surface pump is to inject water into the injection well via the second fluid conduit. A flowmeter is fluidly coupled to the first fluid conduit. The example system includes a processor to control at least one of (a) the downhole pump or the downhole compressor or (b) the surface pump in response to fluid property data generated by the first flowmeter.

An example method includes determining, by executing an instruction with a processor, a property of steam in a multiphase production fluid flowing through a fluid conduit based on a sensor data generated by a flowmeter coupled to the fluid conduit, the production fluid to be generated via a production well including at least one of a downhole pump or a downhole compressor; determining, by executing an instruction with a processor, a command for at least one of a downhole pump or a downhole compressor or (b) a surface pump in response to the property of the steam; and transmitting, by executing an instruction with the processor, the command to the at least one of (a) the downhole pump or the downhole compressor or (b) the surface pump to cause an adjustment to the property of the steam.

An example apparatus includes a flowmeter including a first pressure sensor disposed at a first location along a fluid conduit, a second pressure sensor disposed at a second location along the fluid conduit; a temperature sensor disposed at a third location along the fluid conduit; a radioactive source coupled to the fluid conduit to emit an electromagnetic radiation signal; and a detector coupled to the fluid conduit to detect the electromagnetic radiation signal and to generate signal detection data based on the detection. The example apparatus includes a processor to determine a property of a multiphase fluid flowing in the fluid conduit based on pressure data generated by the first pressure sensor, pressure data generated by the second pressure sensor, temperature data generated by the temperature sensor, and the signal detection data generated by the detector.

Another example apparatus includes a flowmeter including a fluid conduit and a first light source to emit a first light at a first wavelength and a second light at a second wavelength. The first light and the second light are to pass through the fluid conduit. The example apparatus includes a first light detector to (a) detect the first light passing through the fluid conduit and generate first transmittance data in response to the detection of the first light and (b) detect the second light passing through the fluid conduit and generate second transmittance data in response to the detection of the second light. The example apparatus includes a processor to determine a water fraction of water in a steam flow flowing through the fluid conduit based on the first transmittance data and the second transmittance data.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended to familiarize the reader with certain aspects and contexts of some embodiments without limitation to the claimed subject matter.

Figure 1:
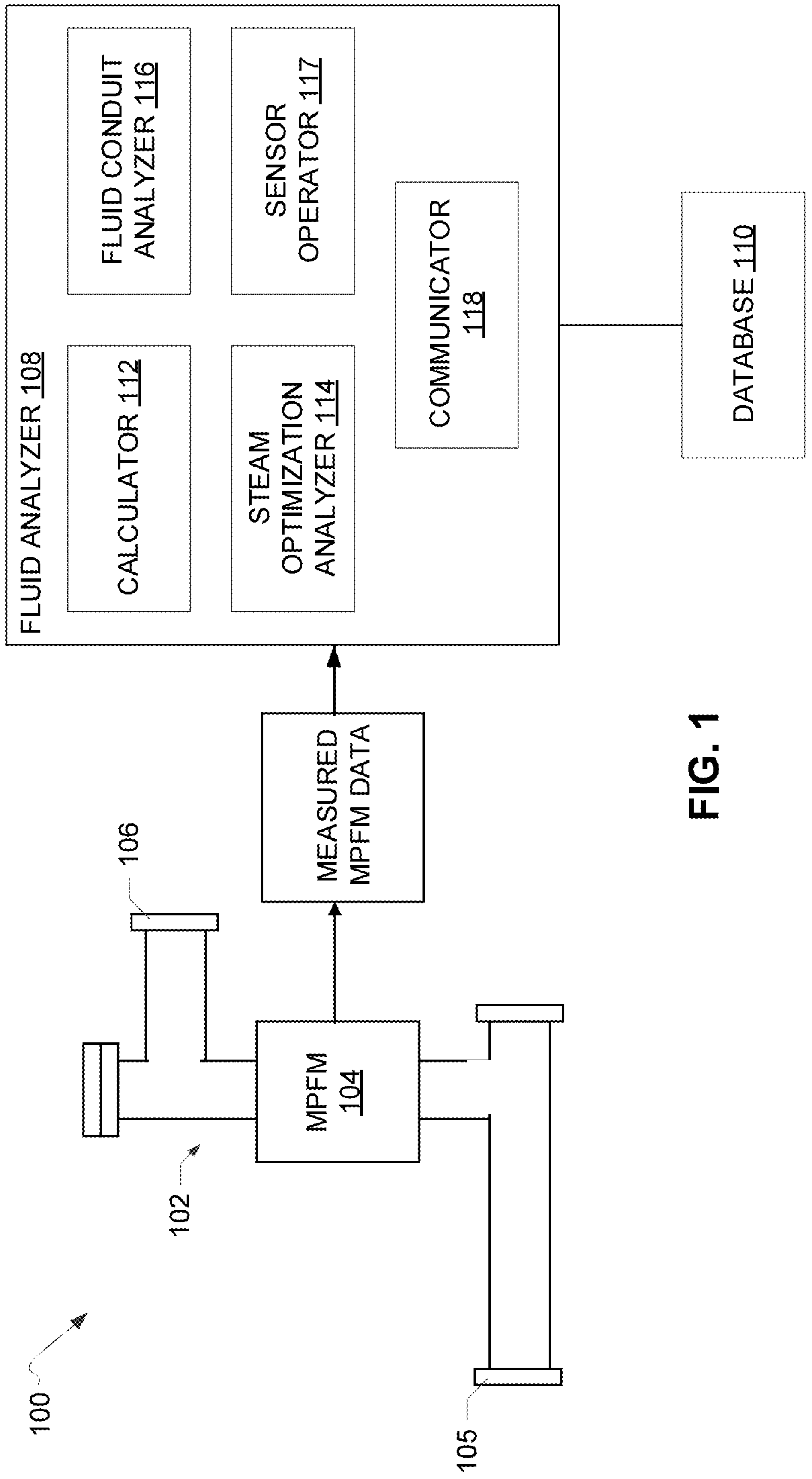
FIG. 1 illustrates an example system for analyzing properties of a multiphase fluid including steam using a multiphase flowmeter (MPFM) and a fluid analyzer in accordance with teachings of this disclosure.
Figure 4:
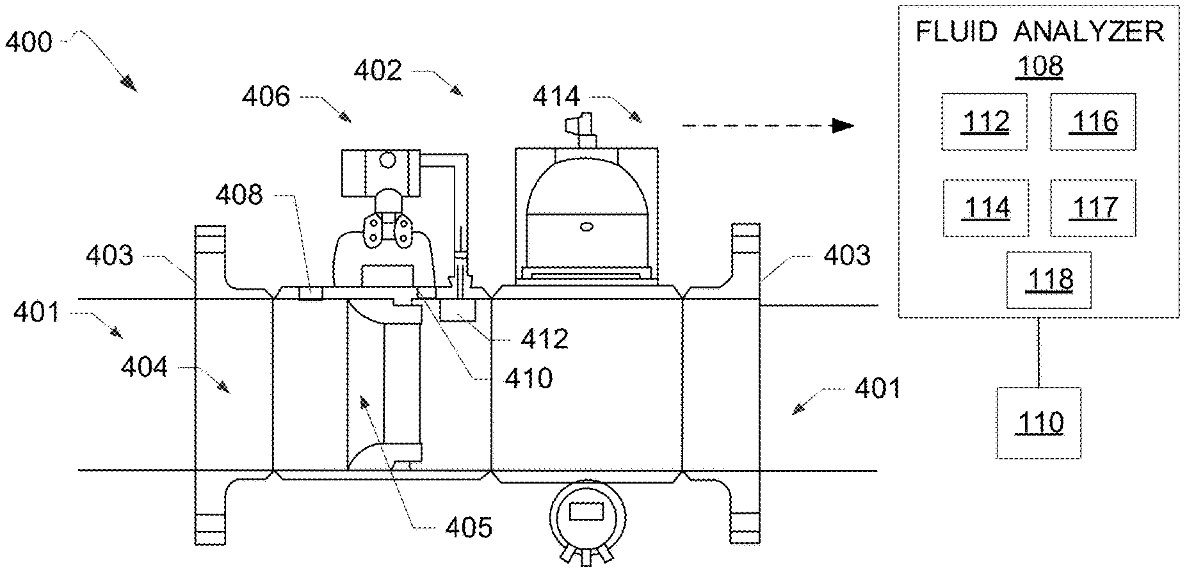
Figure 5:
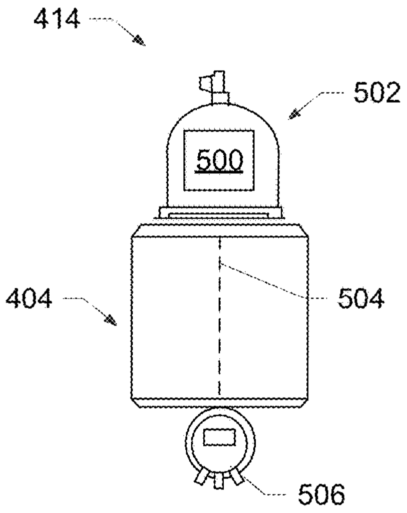

FIGS. 4 and 5 illustrate another example system for analyzing properties of a multiphase fluid including steam using a multiphase flowmeter and the example fluid analyzer of FIG. 1 in accordance with teachings of this disclosure.

Figure 6:
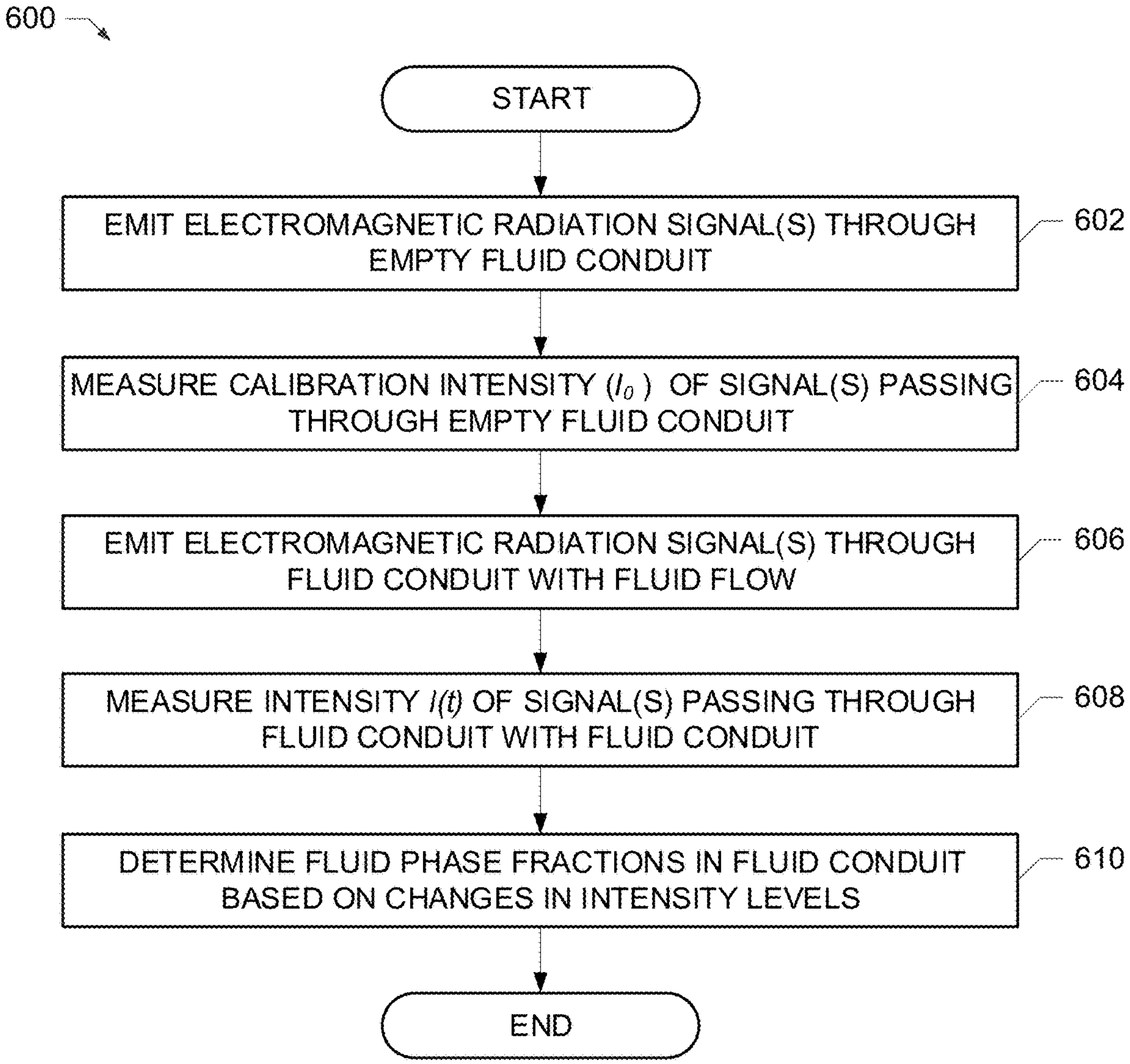

FIG. 6 is a flowchart of an example method for determining fluid phase fractions and steam quality in a fluid conduit in accordance with teachings of this disclosure.

Figure 7:
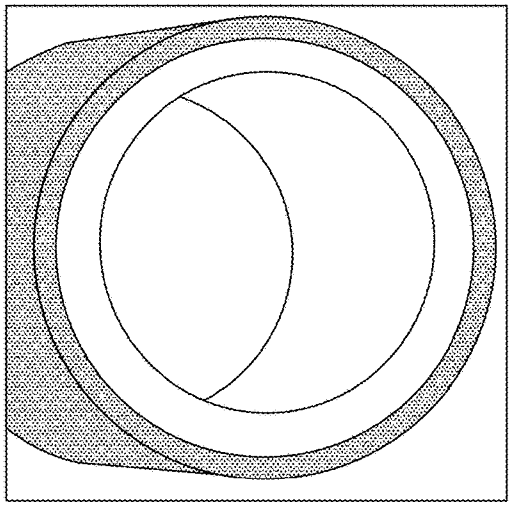
Figure 8:
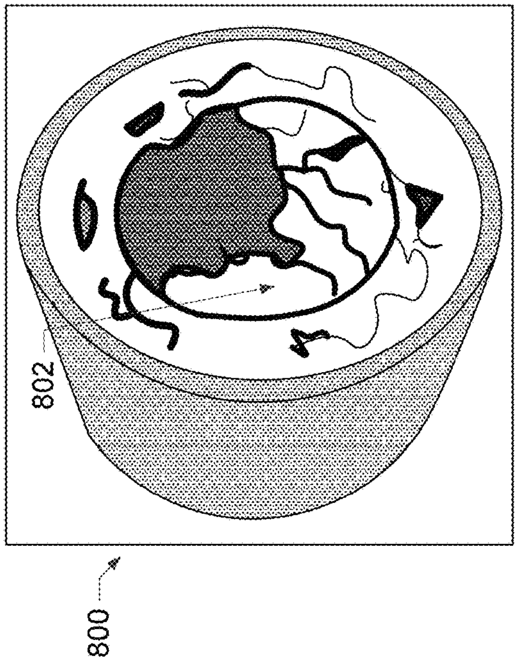
Figure 9:
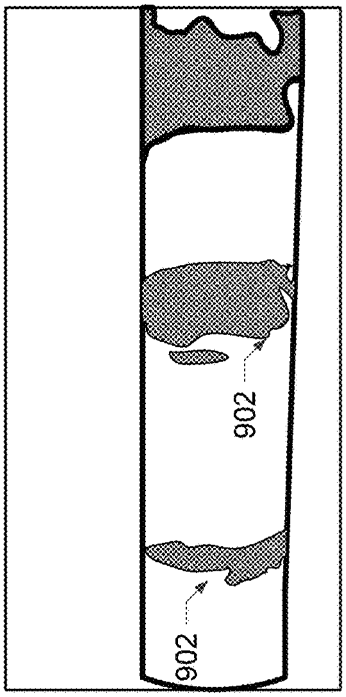

FIGS. 7-9 illustrate example production pipes for carrying production fluid.

Figure 10:
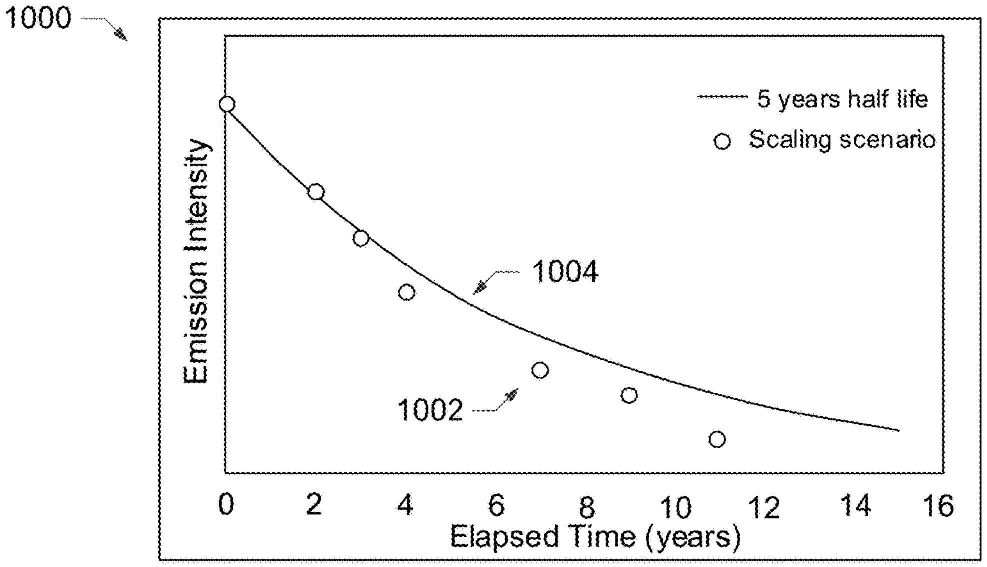

FIG. 10 is a graph plotting radioactive emission intensity versus time.

Figure 11:
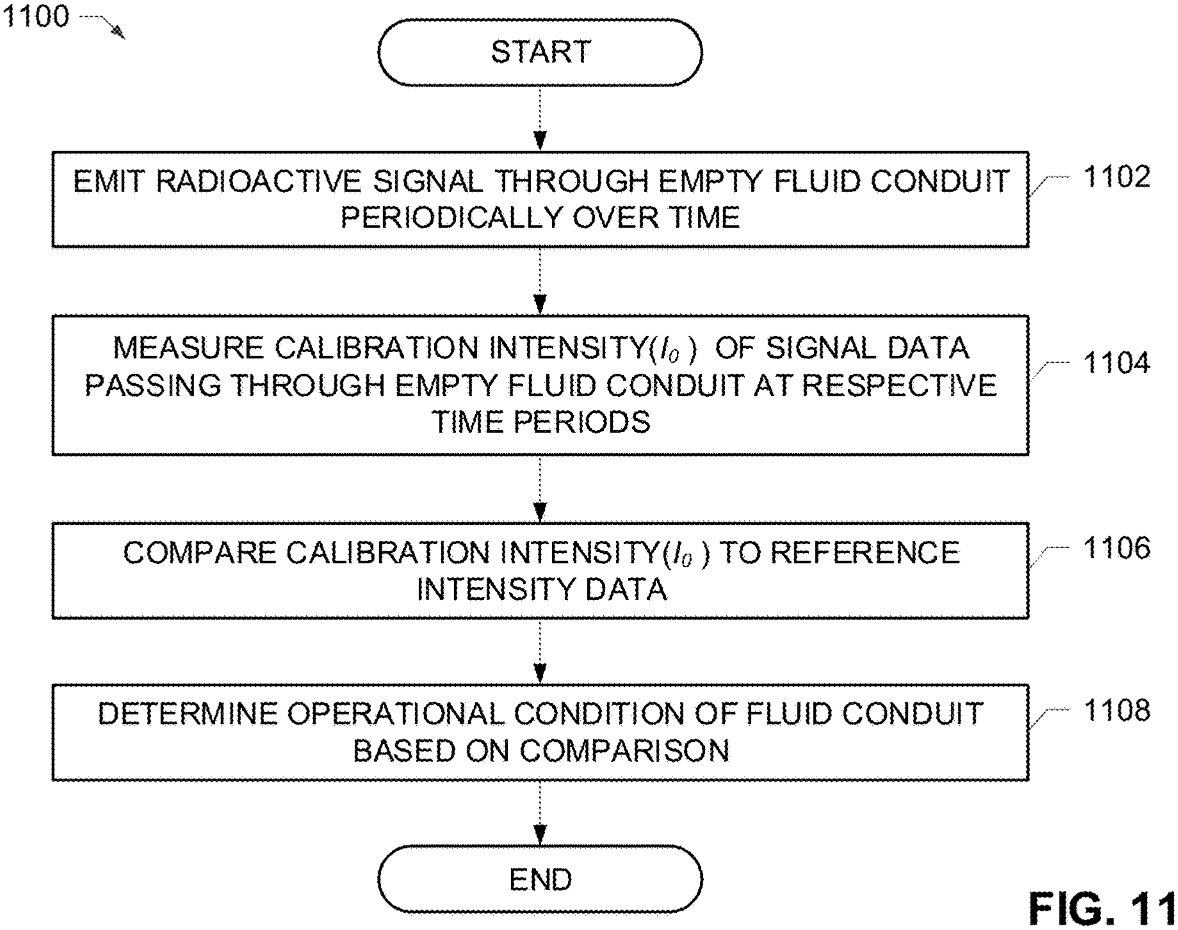

FIG. 11 is a flowchart of an example method for determining an operation condition of a production pipe in accordance with teachings of this disclosure.

Figure 12:
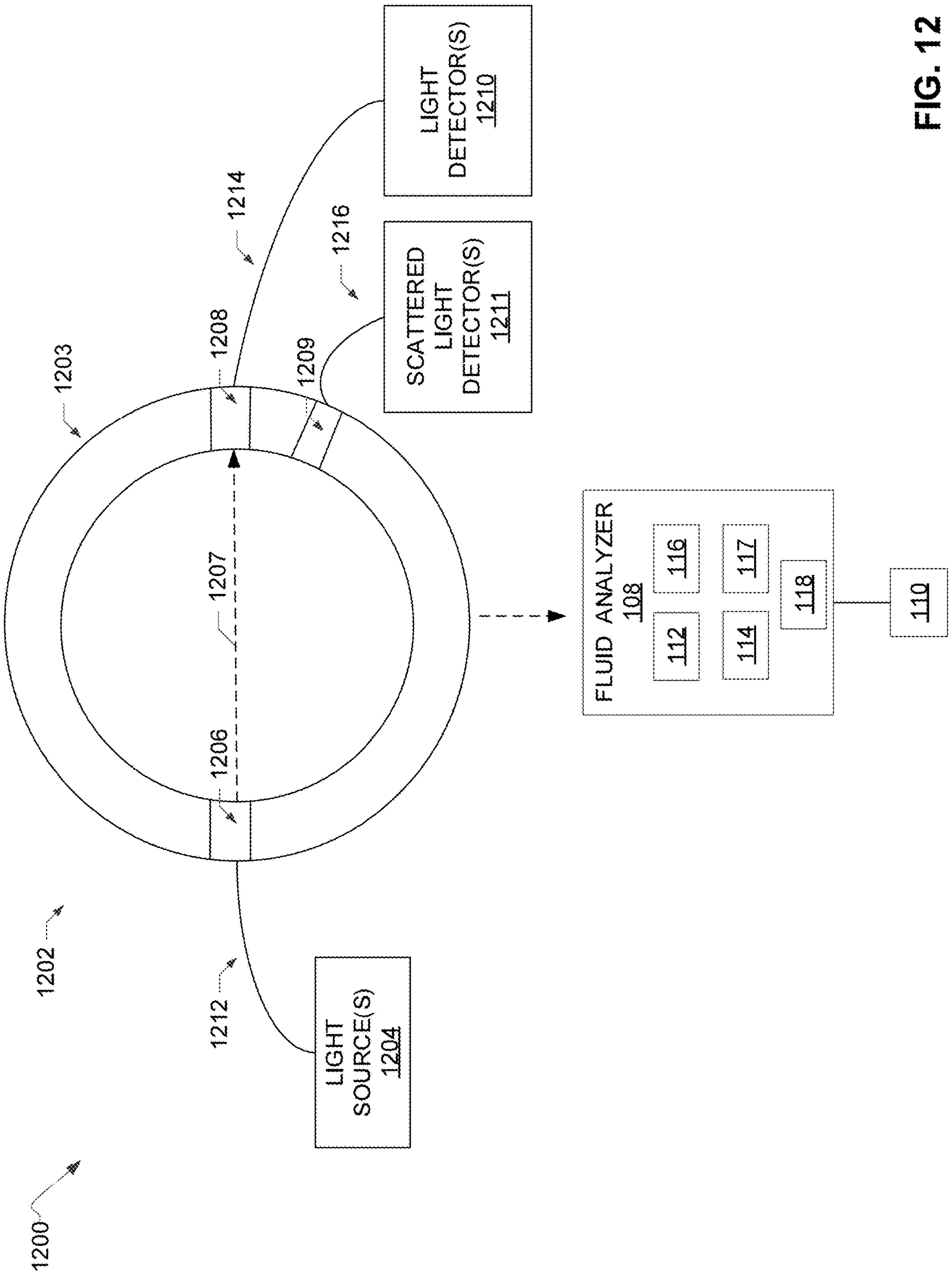

FIG. 12 illustrates an example system for monitoring fluid phase fractions and steam quality in accordance with teachings of this disclosure.

Figure 13:
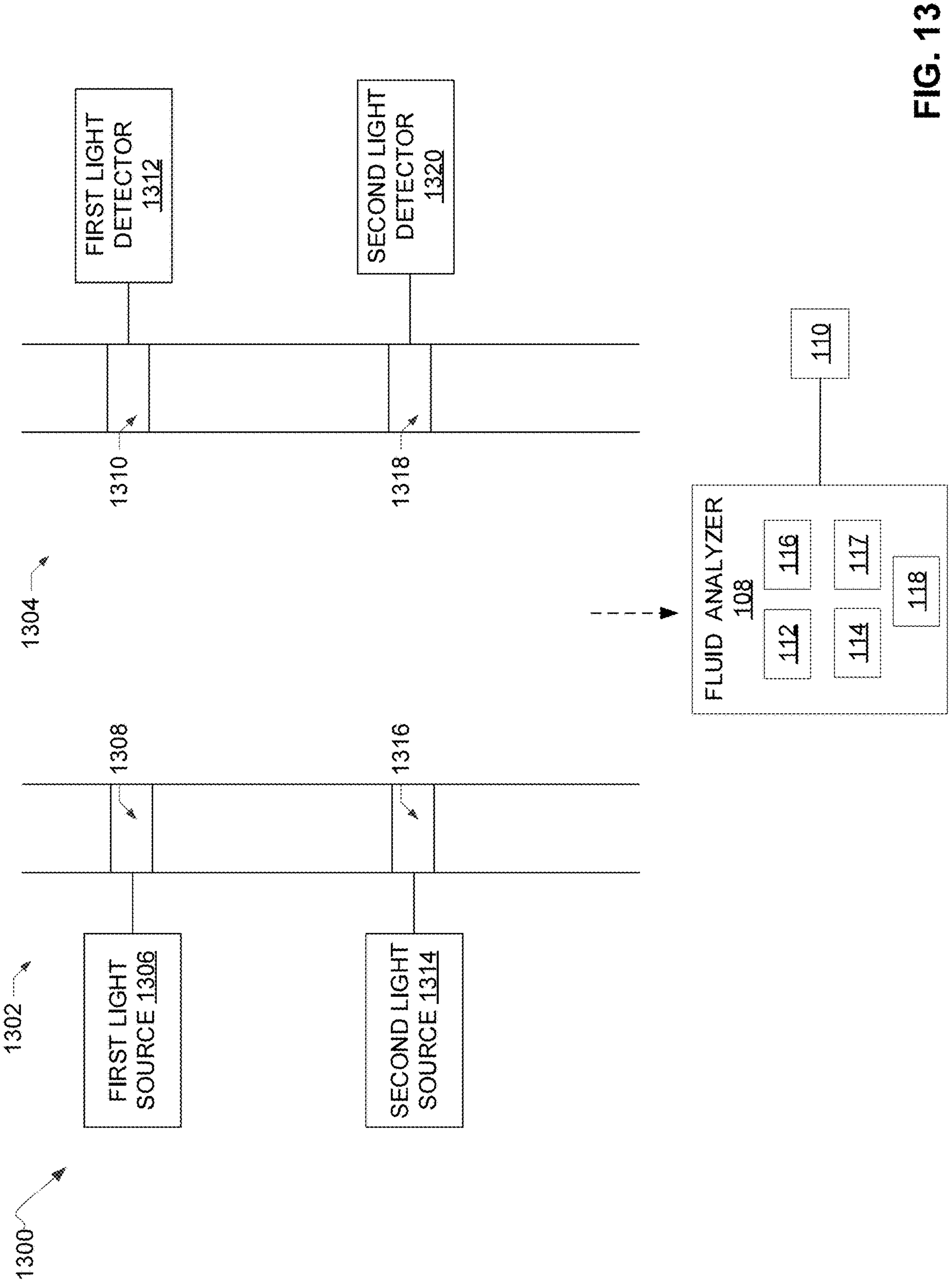

FIG. 13 illustrates another example system for monitoring fluid phase fractions and steam quality in accordance with teachings of this disclosure.

Figure 14:
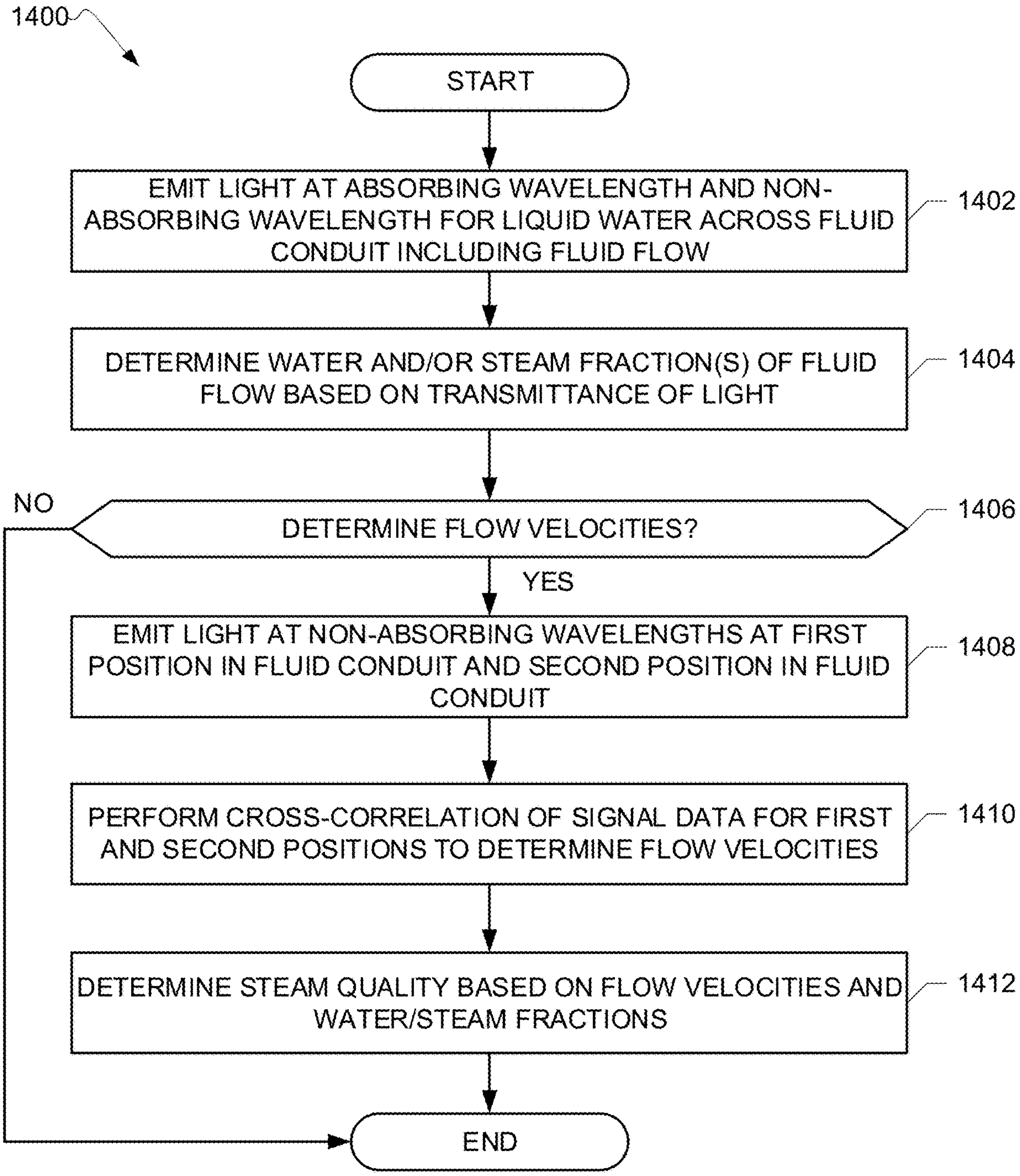

FIG. 14 is a flowchart of an example method for monitoring fluid phase fractions and steam quality in accordance with teachings of this disclosure.

Figure 15:
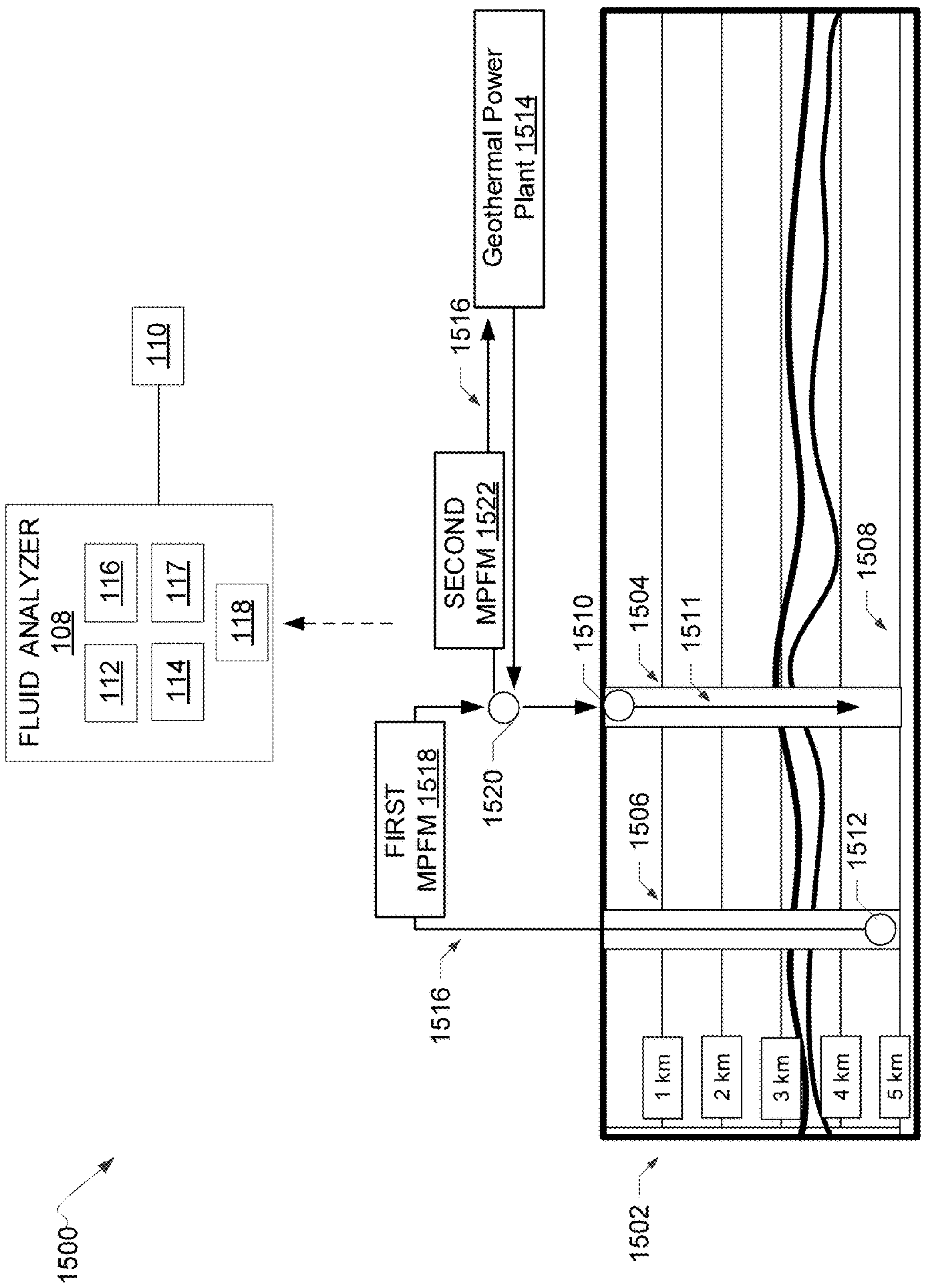

FIG. 15 illustrates an example geothermal production system in accordance with teachings of this disclosure.

Figure 16:
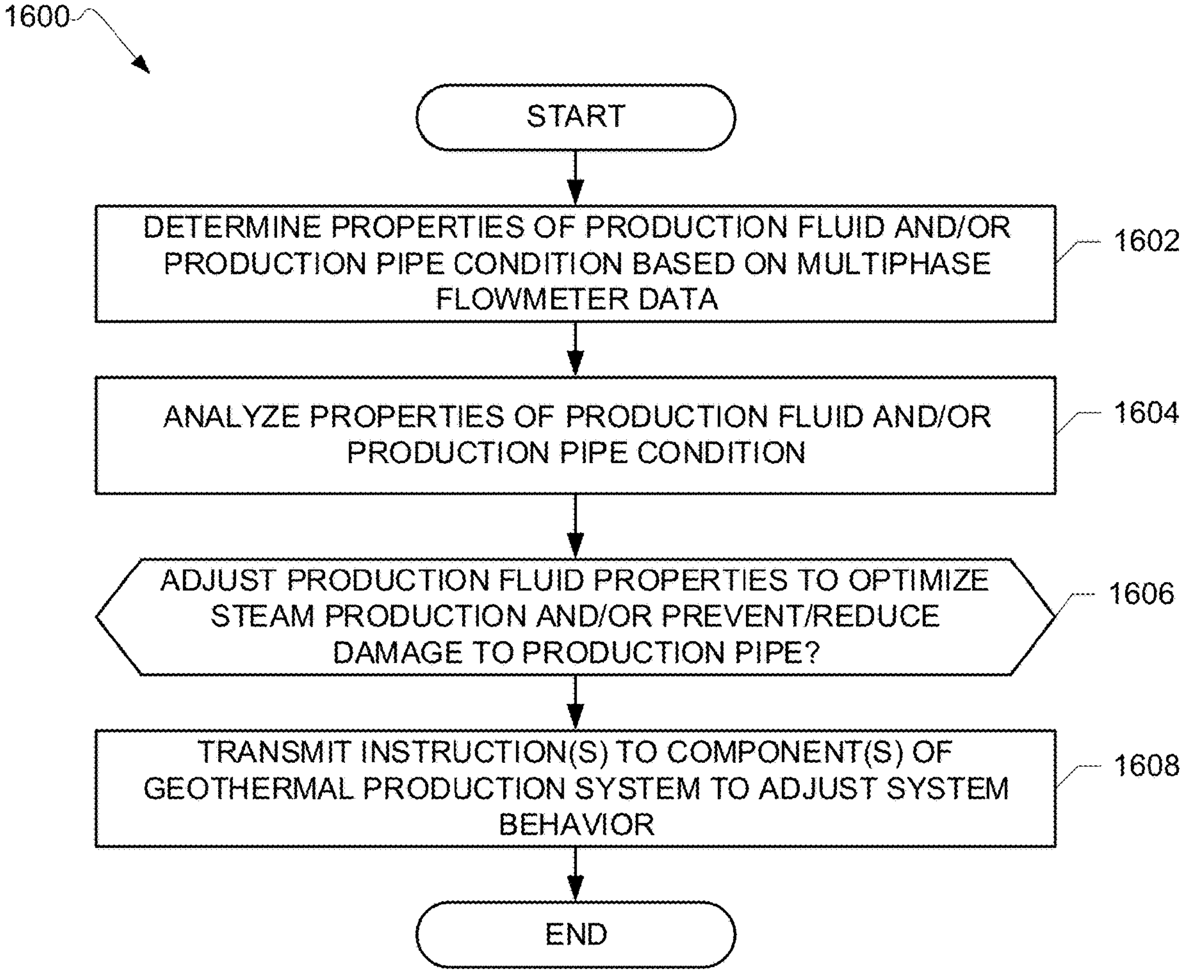

FIG. 16 is a flowchart of an example method for optimizing steam production in a geothermal production system in accordance with teachings of this disclosure.

Figure 17:
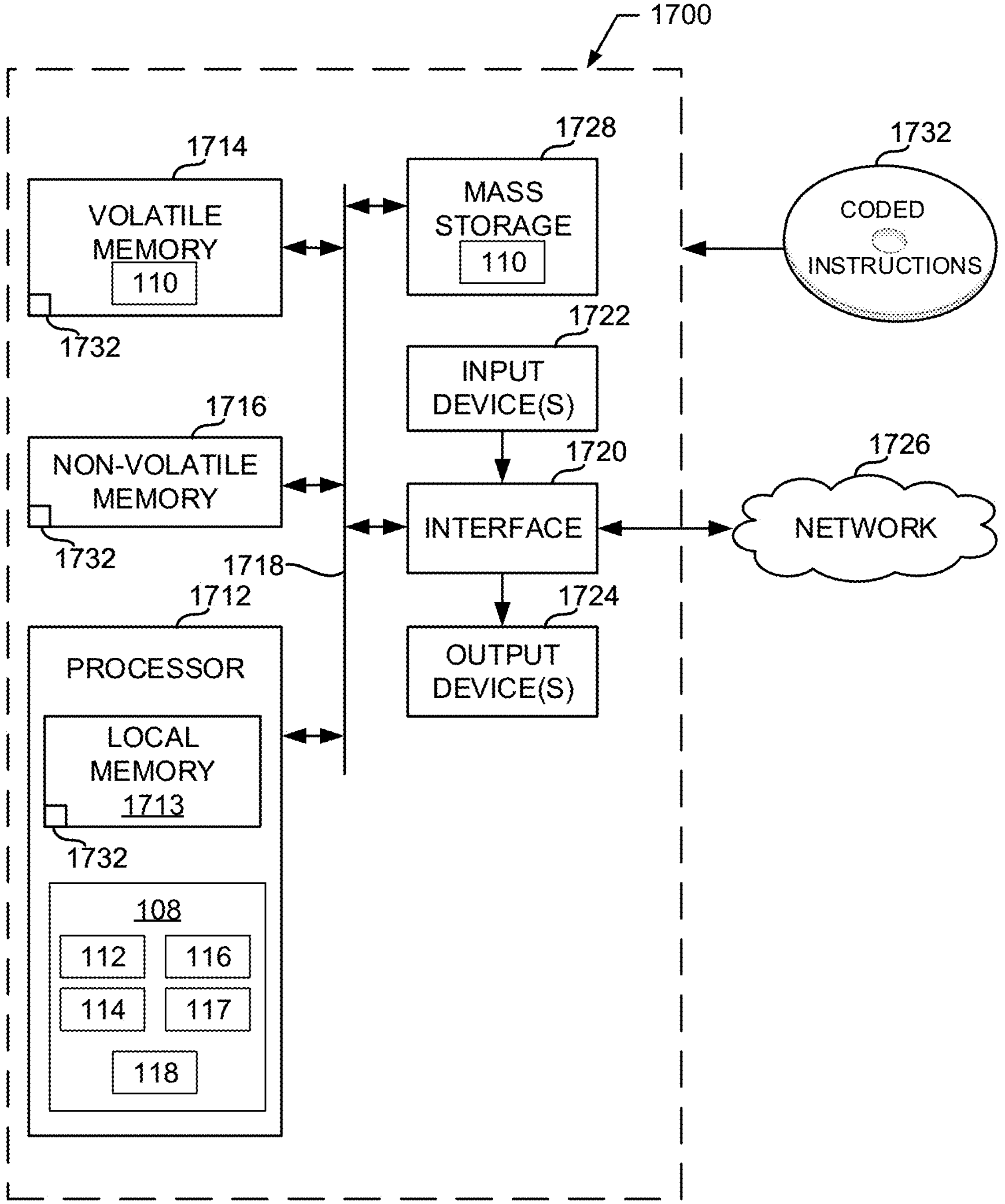

FIG. 17 is a block diagram of an example processing platform structured to execute the instructions of FIGS. 3, 6, 11, 14, and/or 16 to implement the example fluid analyzer of FIGS. 1, 2, 4, 12, 13, and/or 15.

The figures are not to scale. In general, the same reference numbers will be used throughout the drawing(s) and accompanying written description to refer to the same or like parts.

DETAILED DESCRIPTION

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," and "the" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Geothermal reservoirs produce water steam that can be captured in the form of production fluid as part of geothermal energy recovery. The production fluid is typically a two-phase fluid including water vapor and liquid water and, in some examples, includes trace amounts of minerals and/or chemicals. Steam generated by geothermal wells can be used in a variety of applications such as power generation, mining, industrial operations, etc. Monitoring properties of the steam can be used to optimize steam production at the geothermal reservoir.

Production fluid enthalpy is an important performance indicator for two-phase geothermal well resources. Accurate and up-to-date enthalpy measurements are important in geothermal resource development and exploitation. Further, changes in enthalpy are often the first sign of changes in geothermal reservoir condition. As such, enthalpy monitoring can serve as a basis for a geothermal reservoir management program. Steam quality, or the mass flow rate fraction of steam vapor flow relative to the total mass flow rate of the vapor and liquid water, is another property that can be monitored with respect to geothermal reservoir performance.

Production enthalpy can be determined as a function of individual flow rates of water vapor and liquid water in the two-phase production fluid. Some known methods for determining water vapor and liquid flow rate measurements are based on fluid separation by a dedicated device for separating the phases. In such known examples, the flow rates of the water vapor phase and the water liquid phase are measured individually for single phase flows. Other known examples for measuring water vapor and liquid flow rate measurements include injecting liquid and gas tracers into the respective phases of the multiphase production fluid under steady-state conditions. Samples of each phase are collected downstream of the trace injection location. The samples are used to determine properties such as flow rates and enthalpy and can be used to trigger manual adjustments to the production system by operator(s). However, tracer techniques require the samples to be collected on site and shipped to a laboratory for chemical analysis. Thus, the measurements may only be performed intermittently and the results are available after a delay from sample collection time. Further, such periodic measurements do not provide adequate information to optimize complex reservoir processes.

Conditions of the production pipes that carry the production fluid at the surface can also affect the properties of the steam. For example, buildup of deposits or scaling may occur over time in the pipes that carry steam. Geothermal production pipes are exposed to two-phase fluids containing steam and water with trace amount of minerals and/or chemicals. Depending on the composition of trace minerals/chemicals in the production well, scales may be deposited and accumulate inside the geothermal piping. Additionally, the piping is susceptible to erosion and corrosion damage, causing a reduction in piping wall thickness.

Known methods to detect scale, erosion, and corrosion typically involve bulky equipment and the detection is done periodically. The equipment used to detect scale deposition may be different from the equipment used to measure erosion and corrosion damage, giving rise to additional time and costs to geothermal plants to have production pipes inspected.

Disclosed herein are example systems and methods for providing in-line monitoring of production fluid generated by geothermal reservoirs. In examples disclosed herein, the monitoring is performed in substantially real-time (e.g., within seconds or minutes of detecting data for the fluid flow). Examples disclosed herein include multiphase flowmeters to measure the properties of steam, such as quality, quantity, and energy content, as the production fluid flows through production piping and without separation of the production fluid into the respective liquid and vapor phases.

Some example multiphase flowmeters disclosed herein include, for instance, a differential pressure generating device (e.g., a Venturi tube), a phase fraction detector (e.g., a gamma ray densitometer), fluid pressure sensor(s), and fluid temperature sensor(s). Data generated by the multiphase flowmeter can be used to determine a total flow rate of the mixture. Examples disclosed determine individual flow rates of the water vapor phase and the liquid water phase based on the vapor phase fraction and the total flow rate of the mixture and without separating or sampling the phases of the production fluid. Examples disclosed herein determine enthalpy of the production fluid based on the individual phase flow rates.

Some example multiphase flowmeters include a radioactive source (e.g., a gamma ray source) to emit high energy photons through the production pipe to generate (count-rate) intensity data that is used to determine phase fractions of the multiphase production fluid. In some examples, the high energy photons are periodically emitted through an empty pipe and the transmitted intensity of the detected signal is measured. Changes in the intensity of the detected signal are monitored over time to identify scale deposition and/or piping damage (e.g., a reduction in pipe wall thickness due to corrosion) in the geothermal production piping.

Example multiphase flowmeters disclosed herein can be implemented in geothermal production systems to optimize steam production. In examples disclosed herein, data generated by the multiphase flowmeters is processed by a fluid analyzer. The fluid analyzer is communicatively coupled (e.g., via wired or wireless communication protocols) to one or more components of the geothermal production systems, such as pumps, compressors, valve actuators, etc. Based on the data generated by the multiphase flowmeters, the fluid analyzer can instruct the component(s) of the geothermal production system to adjust flow rate, temperature, pressure, etc. to optimize steam production.

FIG. 1 illustrates an example system 100 for measuring properties of a multiphase production fluid including a water vapor (steam) phase and at least a second liquid water phase flowing through fluid conduit 102 (e.g., a pipe), such as steam quality, quantity, and energy content. The example system 100 can be implemented in a geothermal production system including a geothermal well that produces the production fluid including steam.

The example system 100 of FIG. 1 includes a multiphase flow meter (MPFM) 104. As shown in FIG. 1, the MPFM 104 is fluidly coupled to the fluid conduit 102 such that the fluid entering an inlet 105 of the fluid conduit 102 passes through the MPFM 104 as the fluid travels to an outlet 106 of the fluid conduit 102. As disclosed herein, the MPFM 104 includes sensor(s) to generate data that is used to analyze properties of the multiphase fluid. The sensor(s) can include, for example, temperature sensor(s), pressure sensor(s), differential pressure sensor(s), microwave sensor(s), optical sensor(s), gamma ray densitometer(s), etc.

In the example of FIG. 1, data generated by the sensor(s) of the MPFM 104 is transmitted to a fluid analyzer 108. The fluid analyzer 108 of FIG. 1 can be implemented by one or more processors, e.g., downhole processor(s), processor(s) located at the surface, edge computing device(s), and/or cloud-based device(s) (e.g., server(s), processor(s), and/or virtual machine(s)). The data transmitted to the fluid analyzer 108 is stored in a database 110. The database 110 may be located at the fluid analyzer 108 or located elsewhere and in communication with the fluid analyzer 108.

The example fluid analyzer 108 analyzes the sensor data generated by the MPFM 104 to determine one or more properties of the fluid. The example fluid analyzer 108 includes a calculator 112. The calculator 112 analyzes the sensor data to determine fluid properties such as total mass flow rate of the production fluid, steam mass flow rate, liquid water mass flow rate, phase fractions, and steam quality. The result(s) generated by the calculator 112 can be stored in the database 110. The database 110 can also store reference data such as thermodynamic properties of steam and water as a function of pressure and temperature and/or fluids calibration data for the MPFM 104, such as for a gamma ray densitometer. The reference data can be defined by user input(s).

The example fluid analyzer 108 includes a steam optimization analyzer 114. As disclosed herein, based on the properties of the fluid as determined by the calculator 112, the steam optimization analyzer 114 generates instructions to, for instance, adjust the quality and flow rate of the steam generated by the geothermal production system that includes the MPFM 104. For example, the steam optimization analyzer 114 generates instructions for a downhole pump or a compressor in the geothermal well to increase operational speed, which results in an increased production of steam. As disclosed herein, in some examples, the steam optimization analyzer 114 can generate instructions for a surface water injection pump to reduce operational speed, which may result in a reduced rate at which water is injected into an injection well.

The example fluid analyzer 108 of FIG. 1 includes a fluid conduit analyzer 116. As disclosed herein, the fluid conduit analyzer 116 analyzes the data generated by the MPFM 104 to detect operational conditions of the fluid conduit 102 with respect to scale deposition on an interior of the fluid conduit 102 and/or corrosion of the fluid conduit 102. In some examples, the fluid conduit analyzer 116 communicates with the steam optimization analyzer 114 to adjust production of the steam to prevent, decrease, or minimize scale deposition.

The example fluid analyzer 108 of FIG. 1 includes a sensor operator 117. The sensor operator 117 can control the operation or facilitate calibration of one or more components of the MPFM 104 (e.g., sensor(s), gamma ray densitometer(s), etc.). The sensor operator 117 controls the MPFM 104 based on operation rule(s) defined by user input(s) and stored in the database 110.

The example fluid analyzer 108 of FIG. 1 includes a communicator 118. The communicator 118 facilitates instructions generated by the steam optimization analyzer 114 and/or the sensor operator 117 to one or more devices (e.g., sensor(s), actuator(s), etc.) communicatively coupled to the fluid analyzer 108. The communicator 118 transmits the instructions via one or more wired or wireless communication protocols.

While an example manner of implementing the fluid analyzer 108 is illustrated in FIG. 1, one or more of the elements, processes and/or devices illustrated in FIG. 1 may be combined, divided, re-arranged, omitted, eliminated and/or implemented in any other way. Further, the example database 110, the example calculator 112, the example steam optimization analyzer 114, the example fluid conduit analyzer 116, the example sensor operator 117, the example communicator 118, and/or, more generally, the example fluid analyzer 108 of FIG. 1 may be implemented by hardware, software, firmware and/or any combination of hardware, software and/or firmware. Thus, for example, any of the example database 110, the example calculator 112, the example steam optimization analyzer 114, the example fluid conduit analyzer 116, the example sensor operator 117, the example communicator 118, and/or, more generally, the example fluid analyzer 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example database 110, the example calculator 112, the example steam optimization analyzer 114, the example fluid conduit analyzer 116, the example sensor operator 117, and/or the example communicator 118 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fluid analyzer 108 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
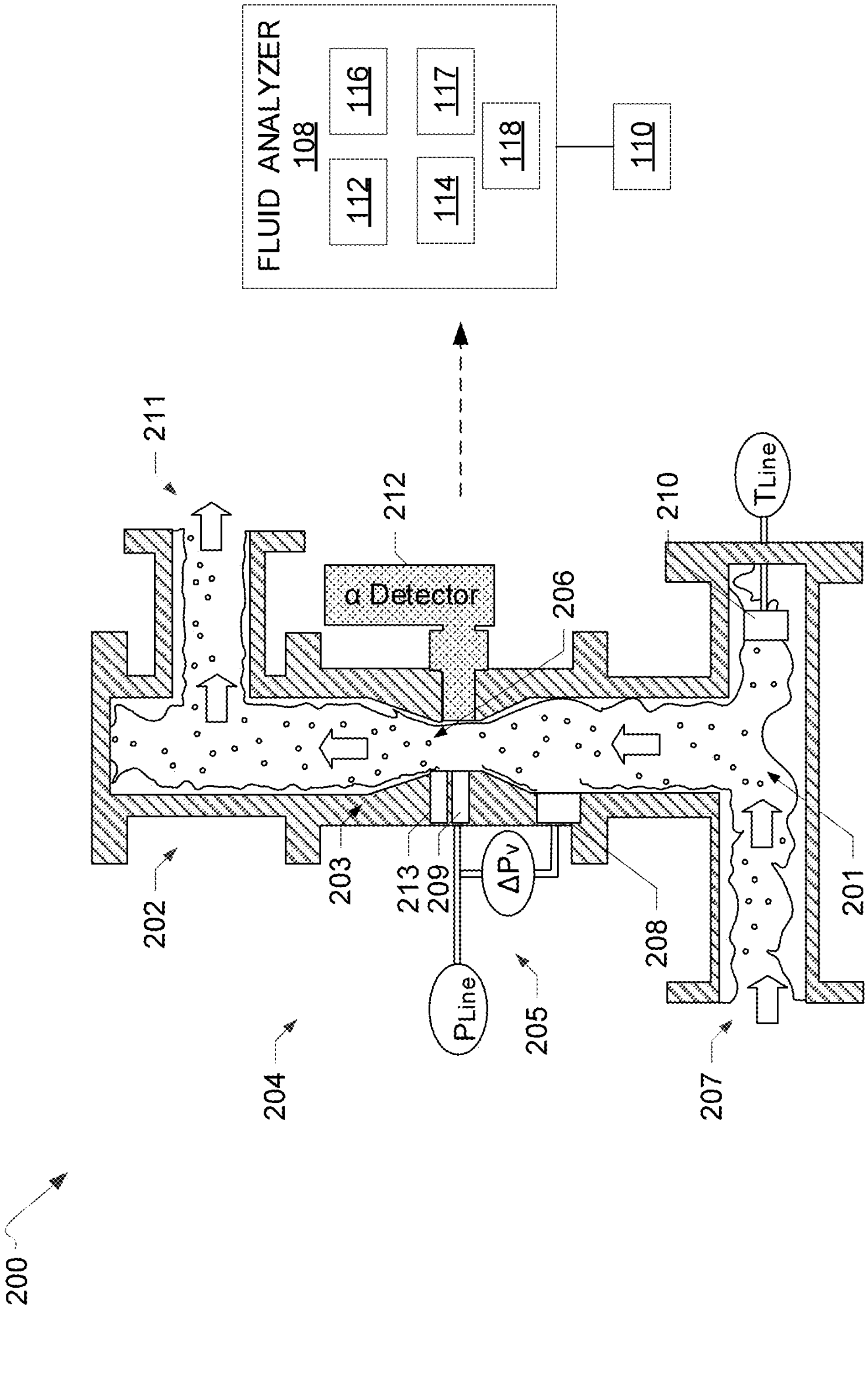
FIG. 2 illustrates another example system for analyzing properties of a multiphase fluid including steam using a multiphase flowmeter and the example fluid analyzer of FIG. 1 in accordance with teachings of this disclosure.

FIG. 2 illustrates an example system 200 to measure properties of a multiphase fluid 201 flowing through a fluid conduit 202 (e.g., the fluid conduit 102 of FIG. 1). The example system 200 includes a multiphase flowmeter (MPFM) 204 (e.g., the multiphase flowmeter 104 of FIG. 1). As disclosed herein, in the example of FIG. 2, data generated by the MPFM 204 is used by the fluid analyzer 108 to measure individual phase flow rates of steam and liquid water of the fluid 201 at in-line conditions without requiring separation or sampling of the fluid 201. The individual flow rates can be used to determine enthalpy of the fluid 201.

The example MPFM 204 of FIG. 2 includes a differential pressure measurement system 205. The differential pressure measurement system 205 includes means for generating a pressure difference in the fluid conduit 202. In the example of FIG. 2, the means for generating the pressure difference includes a Venturi tube 203. In other examples, the means for generating the pressure difference could include an orifice plate or a flow nozzle.

As shown in FIG. 2, the Venturi tube 203 is fluidly coupled to the fluid conduit 202 such that the fluid 201 flowing between an inlet 207 of the fluid conduit 202 and an outlet 211 of the fluid conduit 202 flows through the Venturi tube 203. Although in FIG. 2 the fluid conduit 202 is disposed vertically, in other examples, the fluid conduit 202 and, thus, the Venturi tube 203, could be disposed horizontally.

The differential pressure measurement system 205 of the example MPFM 204 of FIG. 2 includes a first pressure sensor 208 disposed at a first position upstream of a throat 206 of the Venturi tube 203 and a second pressure sensor 209 disposed at the throat 206 of the Venturi tube 203 (e.g., at a throat region). In the example of FIG. 2, the first pressure sensor 208 generates pressure data representing the pressure of the fluid 201 flowing through the fluid conduit 202 prior to entering the throat 206 of the Venturi tube 203. The second pressure sensor 209 generates pressure data representing the pressure of the fluid 201 as the fluid 201 flows through the throat 206 of the Venturi tube 203.

The example MPFM 204 of FIG. 2 includes a temperature sensor 210 to generate temperature data representative of a temperature of the fluid 201 flowing through the fluid conduit 202.

The example MPFM 204 of FIG. 2 includes a phase fraction sensor 212 and a radioactive source 213. In the example of FIG. 2, the phase fraction sensor 212 is disposed at the throat 206 of the Venturi tube 203, diametrically opposite the radioactive source 213. The phase fraction sensor 212 and a housing including the radioactive source 213 may be coupled (e.g., mechanically coupled to via clamps or other fasteners) to an exterior surface of the Venturi tube 203. As disclosed herein (FIGS. 4 and 5), the radioactive source 213 and the phase fraction sensor 212 can be located at different positions along the fluid conduit 202 than the example shown in FIG. 2 (e.g., downstream of the Venturi tube 203).

The phase fraction sensor 212 generates signal data indicative of phase fractions of steam and water in the fluid 201 in response to emission of radiation by the radioactive source 213. In the example of FIG. 2, the phase fraction sensor 212 is a gamma-ray densitometer. In other examples, the phase fraction sensor 212 can include a microwave sensor, an optical (e.g., infrared) sensor, or an ultrasonic sensor. In such examples, a microwave source, an optical source, or an ultrasonic source may be used instead of the radioactive source 213 based on phase fraction sensor type.

In the example of FIG. 2, the pressure data generated by the pressure sensors 208, 209, the temperature data generated by the temperature sensor 210, and the phase fraction data generated by the phase fraction sensor 212 are transmitted to the fluid analyzer 108 via one or more wired or wireless communication protocols for processing by the calculator 112. The transmitted data can be stored in the database 110.

Figure 3:
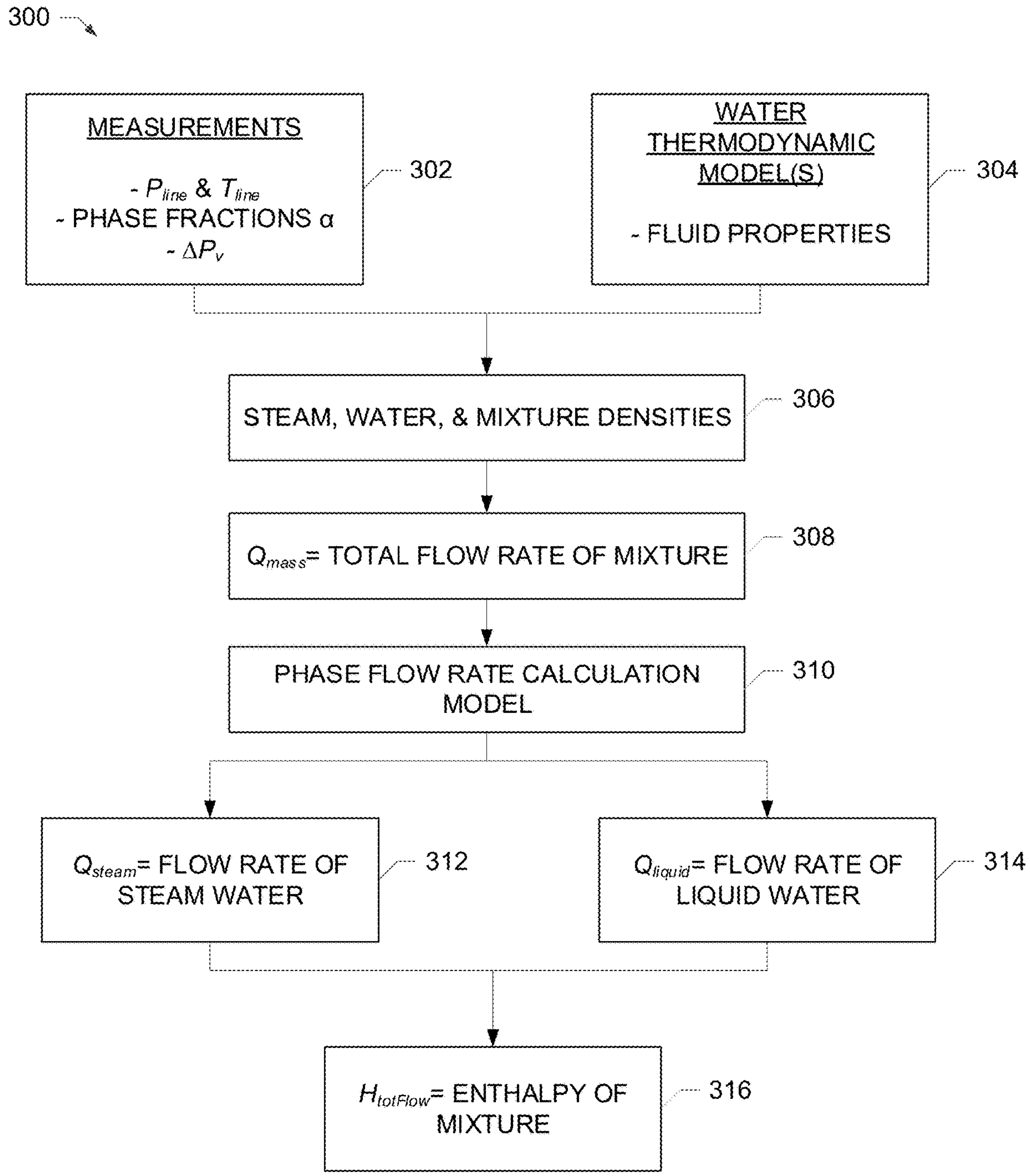
FIG. 3 is a flow diagram of an example algorithm to be executed by the example fluid analyzer of FIGS. 1 and/or 2 to determine flow rates and enthalpy of a multiphase fluid including steam in accordance with teachings of this disclosure.

FIG. 3 is a flow diagram illustrating an example algorithm 300 to determine individual phase flow rates of steam and liquid water of the multiphase production fluid (e.g., the fluid 201 of FIG. 2) and enthalpy of the fluid. The example algorithm 300 can be executed by the calculator 112 of the example fluid analyzer 108 of FIGS. 1 and 2.

At block 302, the calculator 112 of the fluid analyzer 108 retrieves the pressure data generated by the respective first and second pressure sensors 208, 209, the temperature data generated by the temperature sensor 210, and the phase fraction data ($\alpha$) for steam and liquid water generated by the phase fraction sensor 212 from the database 110. The calculator 112 calculates a differential pressure $\Delta P_v$ of the fluid 201 flowing from the fluid conduit 202 into the Venturi tube 203 of FIG. 2. At block 304, the calculator 112 retrieves one or more predefined water thermodynamic model(s) stored in the database 110 of FIGS. 1 and 2. The thermodynamic model(s) can include reference data for correlating steam quality (e.g., steam density $\rho_s$, water density $\rho_w$, steam-mass rate/total mass-rate) in view of the measured pressure data $P_{line}$ (e.g., as measured by the second pressure sensor 209 of FIG. 2) and the temperature data $T_{line}$ as measured by the temperature sensor 210.

At block 306, the calculator 112 of the fluid analyzer 108 calculates individual phase densities for steam and water in the fluid 201 based on the measured line pressure $P_{line}$ (e.g., as detected by the second pressure sensor 209 disposed at the throat 206 of the Venturi tube 203), the temperature data $T_{line}$ measured by the temperature sensor 210, and the thermodynamic model(s) (e.g., reference density data as a function of pressure and temperature) stored in the database 110. The calculator 112 calculates mixture density, $$\rho_m(\rho_m=\alpha_s\rho_s+(1-\alpha_s)\rho_w) \quad \text{(Eq. 1)},$$

for the fluid using the steam phase fraction data $\alpha_s$ and liquid water phase fraction data $(1-\alpha_s)$ generated by the phase fraction sensor 212 of FIG. 2 and the individual phase densities for steam and liquid water.

At block 308, the calculator 112 calculates a total mass flow rate $Q_{mass}$ for the fluid based on the differential pressure $\Delta P_v$ and the mixture density, $$(Q_{mass}\sim K(\Delta P_v\rho_m)^{1/2} \quad \text{(Eq. 2)},$$

where K is a parameter depending on, for example, the restriction-to-inlet diameter ratio of the differential pressure generating device (e.g., the Venturi tube 203), the cross-sectional area of the restriction such as the Venturi throat 206, and the discharge coefficient of the differential pressure generating device.

At block 310, the calculator 112 executes a phase flowrate calculation model (e.g., a gas/liquid slip model) to calculate the gas volume fraction (GVF) from the steam fraction $\alpha_s$ and steam quality, $$x=\rho_s\mathrm{GVF}/[\rho_s\mathrm{GVF}+\rho_w(1-\mathrm{GVF})] \quad \text{(Eq. 3)},$$

(given the steam density $\rho_s$ and water density $\rho_w$), to split the total mass flow rate $Q_{mass}$ of the multiphase fluid into a vapor mass flowrate, $Q_{steam}$, where $$Q_{steam}=xQ_{mass} \quad \text{(Eq. 4)},$$

representing a flow rate of steam in the multiphase fluid (block 312) and a liquid mass flowrate, $Q_{liquid}$, where $$Q_{liquid}=(1-x)Q_{mass} \quad \text{(Eq. 5)},$$

representing a flow rate of liquid in the multiphase fluid (block 314).

At block 316, the calculator 112 uses the vapor mass flowrate $Q_{steam}$ and the liquid mass flowrate $Q_{liquid}$ to determine an enthalpy $H_{totFlow}$ of the multiphase production fluid including steam and liquid water. In the example of FIG. 3, the individual flow rates $Q_{steam}$, $Q_{liquid}$ of the steam and liquid water and the individual enthalpies of the steam and water (e.g., as determined based on the reference thermodynamic model(s)) are used to determine enthalpy of the steam/liquid water mixture.

Thus, the example algorithm 300 of FIG. 3 uses correlations between the phase fractions and corresponding densities of the steam and liquid water phases in the multiphase production fluid to determine individual flowrates for steam and liquid water. As disclosed herein, the enthalpy measurements generated from the individual steam and liquid water flow rates are used by the steam optimization analyzer 114 of the example fluid analyzer 108 to optimize steam production for industrial operations such as power generation.

FIG. 4 illustrates an example system 400 for monitoring steam conditions in a multiphase production fluid and operational conditions of a geothermal production pipe or tubing 401 carrying the fluid. The example system 400 includes a multiphase flowmeter (MPFM) 402 (e.g., the MPFM 104 of FIG. 1) to monitor the fluid flowing through a fluid conduit 404. The fluid conduit 404 is coupled to the geothermal production pipe 401 via respective connection interfaces 403. The connection interfaces 403 can include flanges, clamps, or other mechanical fastener(s) to enable the fluid conduit 404 to be inserted into the flow path of the geothermal production pipe 401. In other examples, the fluid conduit 404 is threaded or welded to the geothermal production pipe 401 via the connection interfaces 403.

The fluid conduit 404 of FIG. 4 includes a differential pressure generating device 405, or means for creating a pressure difference in the fluid flowing in the fluid conduit 404. The differential pressure generating device 405 can include a Venturi tube (e.g., the Venturi tube 203 of FIG. 2), a flow nozzle, an orifice plate, or a pitot tube. A flow nozzle is shown in the example of FIG. 4. Also, although in the example of FIG. 4, the fluid conduit 404 is disposed horizontally, in other examples, the fluid conduit 404 could be disposed vertically.

The example MPFM 402 of FIG. 4 includes differential pressure measurement system 406. In the example of FIG. 4, the differential pressure measurement system 406 includes a first pressure sensor 408 to generate pressure data for the fluid before the fluid flows through the differential pressure generating device 405 and a second pressure sensor 410 to generate pressure data for the fluid flowing through the differential pressure generating device 405.

The example of FIG. 4 includes a temperature sensor 412 to generate temperature data for the fluid flowing through the fluid conduit 404. The pressure data generated by the pressure sensors 408, 410 and the temperature data generated by the temperature sensor 412 are transmitted to the fluid analyzer 108 via one or more wired or wireless communication protocols and stored in the database 110.

The example MPFM 402 of FIG. 4 includes a electromagnetic radiation measurement system 414 (e.g., a gamma ray densitometer). The electromagnetic radiation measurement system 414 provides means for determining fluid content inside the fluid conduit 404. In particular, the electromagnetic radiation measurement system 414 measures attenuation of a electromagnetic radiation signal (e.g., a gamma ray photon signal) emitted by a radioactive source of the electromagnetic radiation measurement system 414 due to interactions between atoms in the fluid and the photons emitted by the radioactive source. In the example of FIG. 4, the electromagnetic radiation measurement system 414 is disposed downstream of the differential pressure generating device 405 of the fluid conduit 404. The electromagnetic radiation measurement system 414 could be disposed at other locations such as upstream of the differential pressure generating device 405.

FIG. 5 illustrates a portion of the fluid conduit 404 and the MPFM 402 of FIG. 4 including the electromagnetic radiation measurement system 414. As shown in FIG. 5, the electromagnetic radiation measurement system 414 includes a radioactive source 500 disposed in a housing 502. The housing 502 is coupled (e.g., mechanically coupled via clamp(s) or other fastener(s)) to an external surface of the fluid conduit 404. The housing 502 can include a collimator to collimate (e.g., narrow) the electromagnetic radiation signal(s) (e.g., gamma rays) emitted by the radioactive source 500. The electromagnetic radiation signal(s) emitted by the radioactive source 500 are transmitted across the fluid conduit 404, as represented by line 504 in FIG. 5.

The example electromagnetic radiation measurement system 414 of FIGS. 4 and 5 includes a scintillation detector 506 coupled (e.g., mechanically coupled via clamp(s) or other fastener(s)) to an external surface of the fluid conduit 404 opposite the housing 502 (e.g., 180° from the radioactive source 500). The scintillation detector 506 converts the electromagnetic radiation signal (e.g., the transmitted gamma ray photons) into electrical signal data. The scintillation detector 506 measures an intensity of, for example, the gamma rays emitted by the radioactive source 500 and passing through the fluid conduit 404. Data measured by the scintillation detector 506 can be used to determine phase fractions of the fluid in the fluid conduit 404 as disclosed in connection with FIGS. 2 and 3. In some examples, at least a portion of the fluid conduit 404 is coated with a heat insulating material to protect the components of the electromagnetic radiation measurement system 414 (e.g., the housing 502, the scintillation detector 506) from heat generated by the production fluid.

The data generated by the electromagnetic radiation measurement system 414 of FIGS. 4 and 5 is transmitted to the fluid analyzer 108 via one or more wired or wireless communication protocols. In the examples of FIGS. 4 and 5, the fluid analyzer 108 uses the pressure data generated by the pressure sensors 408, 410, the temperature data generated by the temperature sensor 412, and the data generated by the electromagnetic radiation measurement system 414 of FIGS. 4 and 5 to analyze the fluid flowing through the fluid conduit 404. For example, calculator 112 of the fluid analyzer 108 can calculate water or steam fraction, total flow rate of the fluid, individual phase flow rates, and enthalpy as disclosed in connection with the example algorithm 300 of FIG. 3.

In some examples, the calculator 112 of the fluid analyzer 108 determines a fluid content level or volume fraction (phase fraction $\alpha$) in the fluid conduit 404 based on an attenuation of the electromagnetic radiation signal. FIG. 6 is a flowchart of an example method 600 for determining fluid content in a fluid conduit such as the fluid conduit 404 of FIGS. 4 and 5. At block 602, the radioactive source 500 of the example electromagnetic radiation measurement system 414 of FIGS. 4 and 5 emits an electromagnetic radiation signal(s) (e.g., gamma rays) through the fluid conduit 404 of FIGS. 4 and 5 when no fluid is passing therethrough based on instructions generated by the sensor operator 117 of the fluid analyzer 108. At block 604, the scintillation detector 506 measures a calibration intensity $I_0$ for the electromagnetic radiation signal(s) passing through the empty fluid conduit 404. At block 606, the radioactive source 500 of the electromagnetic radiation measurement system 414 emits electromagnetic radiation signal(s) (e.g., gamma rays) through the fluid conduit 404 when steam/water fluid is flowing through the fluid conduit 404 based on instructions generated by the sensor operator 117 of the fluid analyzer 108. At block 608, the scintillation detector 506 measures an intensity I(t) for the electromagnetic radiation signal(s) passing through the fluid conduit 404 containing fluid therein. At block 610, the calculator 112 of the fluid analyzer 108 determines a fluid content level (steam fraction $\alpha$) in the fluid conduit 404 based on a change in the intensity level I(t) of the electromagnetic radiation attenuation signal data due to the presence of the steam/water fluid mixture in the fluid conduit 404. For example, the calculator 112 determines the attenuation $\lambda(t)$ along an electromagnetic radiation signal beam pathlength d due to the presence of fluid using the following equation:

$$\lambda(t) = \frac{1}{d}\ln\left(\frac{I(t)}{I_o}\right) = \lambda_s\ \alpha(t) + \lambda_w(1 - \alpha(t)). \qquad \text{(Eq. 6a)}$$

The steam fraction $\alpha$ can be derived as:

$$\alpha(t) = \frac{\lambda(t) - \lambda_w}{\lambda_s - \lambda_w}, \qquad \text{(Eq. 6b)}$$

where $$\lambda_s = \frac{1}{d}\ln\left(\frac{I_s}{I_o}\right) \text{ and } \lambda_w = \frac{1}{d}\ln\left(\frac{I_w}{I_o}\right)$$

are the calibrated or calculated electromagnetic radiation signal attenuations in full-steam and full-water, respectively ($I_s$ and $I_w$ are the measured or calculated electromagnetic radiation signal intensity levels in full-steam and full-water, respectively, and stored in the database 110).

Based on the attenuation level of the electromagnetic radiation signal(s) compared to, for instance, the reference attenuation data $\lambda_s$ and $\lambda_w$, the calculator 112 can determine the fluid content level (steam fraction $\alpha$) in the fluid conduit 404.

The calibration intensity data $I_0$ generated by the electromagnetic radiation measurement system 414 when the electromagnetic radiation signal(s) (e.g., gamma rays) are transmitted through the empty fluid conduit 404 of FIGS. 4 and 5 is stored in the database 110 and can be used to monitor an operational condition of the geothermal production pipe with respect to scale deposition and/or corrosion. FIGS. 7-9 show changes in a geothermal production pipe (e.g., the geothermal production pipe 401 of FIG. 4) over time. In particular, FIG. 7 shows a geothermal production pipe 700 prior to use. FIG. 8 shows a geothermal production pipe 800 including mixed silica and sulfide scales 802 deposited on an interior surface of the pipe 800 over time due to fluid flow through the pipe 800. FIG. 9 shows a geothermal process pipe 900 including corroded portions 902.

The information obtained as a result of the emission of a radioactive signal (e.g. gamma rays) through an empty pipe as disclosed in connection with FIGS. 4-6 can be used as an indicator of scale deposition or damage (e.g., corrosion) in the geothermal production pipe(s) 700, 800, 900 of FIGS. 7-9 without the need to physically remove the production pipe from the production line to examine the pipe (and without requiring the use of a separate equipment as is used in known scale deposition and piping wall thickness evaluation techniques). Also, the periodic emission of the radioactive signal through the empty pipe can be used to periodically update calibration intensity data $I_0$ for the electromagnetic radiation measurement system 414 that is stored in the database 110.

The monitoring of the operational condition of the production pipes can be based on the natural decay rate of radioactive source emission intensity over time. Half-life time is the duration of time after which the intensity of emission is divided by a factor of two. The half-life time is constant for a given radioactive material. For example, the half-life time of Barium 133 is about 5 years and the half-life time of Cesium 137 is about 30 years.

FIG. 10 is a graph 1000 showing a comparison of reference half-life data for Barium 133 and calibration intensity data $I_0$ collected over time for an electromagnetic radiation signal such as gamma rays transmitted through an empty production pipe (e.g., the pipes 401, 700, 800, 900 of FIGS. 4 and 7-9). As shown in FIG. 10, after approximately three years of service, the values of gamma ray emission intensity data 1002 for a production pipe deviate from the expected value represented by the reference half-life data 1004. This lower than expected values for the calibration intensity data collected from the production pipe indicates that there is an increase in the scale deposition that is causing attenuation of the gamma ray signal through the pipe. In other examples, if the value of the calibration intensity data for the production pipe is greater than the expected reference data 1004, the calibration intensity data can indicate erosion or corrosion of the pipe.

FIG. 11 is a flowchart of an example method 1100 for monitoring an operational condition of a geothermal production pipe (e.g., the pipes 401, 700, 800, 900 of FIGS. 4 and 7-9). At block 1102, the radioactive source 500 of the example electromagnetic radiation measurement system 414 of FIGS. 4 and 5 emits electromagnetic radiation signal(s) (e.g., gamma rays) through the fluid conduit 404 of FIGS. 4 and 5 periodically when no fluid is passing therethrough based on instructions generated by the sensor operator 117 of the fluid analyzer 108. At block 1104, the scintillation detector 506 measures a calibration intensity $I_0$ for the electromagnetic radiation signal(s) passing through the empty fluid conduit 404 at the respective times. At block 1106, the fluid conduit analyzer 116 of the example fluid analyzer 108 compares the calibration intensity data $I_0$ to reference intensity data, such as the reference data 1004 in the example graph 1000 of FIG. 10. At block 1108, the fluid conduit analyzer 116 determines the operational condition of the fluid conduit 404 (and, thus, the production pipe 401, 700, 800, 900 of FIGS. 4 and 7-9) based on the comparison of the calibration data to the reference data. For example, increased attenuation of the electromagnetic radiation signal(s) emitted through the empty pipe as compared to the reference data can indicate an increase in scale deposition. As another example, decreased attenuation of the electromagnetic radiation signal(s) emitted through the empty pipe as compared to the reference data can indicate corrosion of the pipe.

FIG. 12 illustrates an example system 1200 including a flowmeter 1202 for determining steam and/or liquid water fractions in a production fluid including steam and liquid water. The flowmeter 1202 monitors production fluid flowing through a fluid conduit 1203. In some examples, the flowmeter 1202 is implemented with, for example, the fluid conduit 202 of FIG. 2 or the fluid conduit 404 of the example of FIGS. 4 and 5 (e.g., including a Venturi tube or other differential pressure generating device).

The example flowmeter 1202 of FIG. 12 includes one or more light sources 1204 (e.g., LED(s)) to emit light. In some examples, the light source(s) 1204 include near infrared-red (NIR) light sources. In the example of FIG. 12, light emitted by the light source(s) 1204 passes through a transmitting optical window 1206 defined in the fluid conduit 1203. The light passes across a diameter of the fluid conduit 1203 through a first receiving optical window 1208 opposite the transmitting optical window 1206 via a transmission path 1207. The example flowmeter 1202 of FIG. 12 includes one or more light detecting sensors 1210 to detect transmittance of the light (e.g., photodetector(s), spectrometer(s)). In some examples, the flowmeter 1202 includes one or more detecting sensor(s) 1211 disposed at an angle relative to the transmission path 1207 of the light to detect scattered light. The scattered light passes through a second receiving optical window 1209. The transmitting and receiving optical windows 1206, 1208, 1209 can include material such as synthetic sapphire. In some examples, the light source(s) 1204 are coupled to the transmitting optical window 1206 via a first fiber optic bundle 1212, and the detecting sensor(s) 1210 are coupled to the receiving optical window 1208 via a second fiber optic bundle 1214. The scattered light detecting sensor(s) 1211 are coupled to the third receiving optical window 1209 via a third fiber optic bundle 1216. The fiber optic bundles 1212, 1214, 1216 facilitate transmission of the light between the light source(s) 1204 and the detecting sensor(s) 1210, 1211.

The example fluid analyzer 108 of FIG. 1 is communicatively coupled to the flowmeter 1202 of FIG. 12. The sensor operator 117 of the fluid analyzer 108 instructs the light source(s) 1204 to emit light at a first wavelength associated with a first absorption level for the liquid water in the production fluid. For example, the first wavelength can be 1450 nm. The sensor operator 117 instructs the light source(s) 1204 to emit light at a second wavelength that is a substantially non-absorbing wavelength for the liquid water in the production fluid, such as 1200 nm. In some examples, the light is emitted in pulses.

In the example of FIG. 12, the detecting sensor(s) 1210, 1211 measure the transmittance of light through the fluid conduit 1203 including the steam/water fluid flowing therethrough. Transmittance data generated by the detecting sensor(s) 1210, 1211 is transmitted to the fluid analyzer 108 via one or more wired or wireless communication protocols. The calculator 112 of the fluid analyzer 108 uses the light transmittance data to determine a water fraction of the water in the steam flow. For example, the calculator 112 can analyze the light transmittance data at the first and second wavelengths to remove the scattering effect and use reference transmission/absorption outputs at the emitted wavelengths (e.g., 1450 nm and 1200 nm) to determine the water fraction. In some examples, the reference wavelength data is received from the light source(s) 1204. In some examples, the calculator 112 uses the transmittance data generated by the scattered light detecting sensors 1211 to correct the transmittance data generated by the light detecting sensors 1210 (i.e., the sensor(s) that detect the light along the transmission path 1207) to account for the effects of scattering.

FIG. 13 illustrates an example system 1300 for monitoring steam quality, or mass flow rate fraction of steam vapor flow relative to a total mass flow rate of vapor and free water, of a production fluid including steam and water. The example system 1300 includes a flowmeter 1302. The flowmeter 1302 monitors production fluid flowing through a fluid conduit 1304. In some examples, the flowmeter 1302 is implemented with, for example, the fluid conduit 202 of FIG. 2 or the fluid conduit 404 of the example of FIGS. 4 and 5 (e.g., including a Venturi tube or other differential pressure generating device).

The example flowmeter 1302 of FIG. 13 includes a first light source 1306 (e.g., LED(s)) to emit light through a first transmitting optical window 1308 defined in the fluid conduit 1304. The light transmitted through the first transmitting optical window 1308 passes across a diameter of the fluid conduit 1304 and through a first receiving optical window 1310 opposite the first transmitting optical window 1308. A first light detector 1312 (e.g., photodetector(s), spectrometer(s)) measures transmittance of the light across the fluid conduit 1304 at the first receiving optical window 1310. The example flowmeter 1302 includes a second light source 1314 to emit light through a second transmitting optical window 1316 defined in the fluid conduit 1304 downstream of the first transmitting optical window 1308. The light transmitted through the second transmitting optical window 1316 passes across a diameter of the fluid conduit 1304 and through a second receiving optical window 1318 opposite the second transmitting optical window 1316. A second light detector 1320 (e.g., photodetector(s), spectrometer(s)) measures transmittance of the light across the fluid conduit 1304 at the second receiving optical window 1318. As shown in FIG. 13, the first light source/first light detector pair 1306, 1312 is axially separated from the second light source/second light detector pair 1314, 1320. The transmitting and receiving optical windows 1308, 1310, 1316, 1318 can include material such as synthetic sapphire.

The light sources 1306, 1314 can include near-infrared light sources. Operation of the light sources 1306, 1314 can be controlled by the sensor operator 117 of the fluid analyzer 108. In the example of FIG. 13, the light sources 1306, 1314 emit light at a substantially non-absorbing wavelength for liquid water in the production fluid, such as 1200 nm. Transmittance data generated by the light detectors 1312, 1320 is used by the fluid analyzer 108 to determine flow velocities of the liquid water phase and the vapor water phase.

In the example of FIG. 13, the calculator 112 determines a flow velocity of fast-moving water droplets entrained in the steam phase, which substantially corresponds to steam/vapor velocity, based on a transit time of the transmitted light signals detected by the light source-detector pairs 1306-1312 and 1314-1320, with known axial spacing. Delays in the transit times for the light signals detected by the respective light detector(s) 1312, 1320 are used by the calculator 112 to determine flow velocities. In the example of FIG. 13, the calculator 112 performs cross-correlation processing of the respective signal data generated by the light detector(s) 1312, 1320 to determine the steam flow velocity (e.g., based on the velocity of the water droplets in the steam flow). For example, the calculator 112 analyzes peaks (e.g., peak position, magnitude) in the signal data generated from the cross-correlation of the signals from the light detectors 1312, 1320 to determine velocity of the fast-moving water droplets in the steam phase and a velocity of a slower moving water wall-film in the production fluid. For example, a plot of the cross-correlated signal against transit time can include two peaks, a first peak occurring first in time and having a first magnitude above a pre-defined threshold value and a second peak occurring second in time and having a second magnitude above the pre-defined threshold value. The first peak can indicate faster transit time(s) of the transmitted light signals that are associated with the fast moving water droplets in the steam phase. The second peak can indicate slower transit time(s) of the transmitted light signals that are representative of the slow moving water film on the pipe wall. Based on cross-correlation signal processing, the calculator 112 can determine flow velocities for the steam flow and/or the liquid water flow.

In some examples, one of the first light source or the second light source emits light at an absorbing wavelength for liquid water (e.g., 1450 nm) and a substantially non-absorbing wavelength for liquid water (e.g., 1200 nm) to generate data that can be used to determine water and steam fractions, as disclosed above in connection with the example flowmeter 1202 of FIG. 12. In such examples, the calculator 112 can determine a water flow rate of the steam flow based on the flow velocity determined via the signal cross-correlation analysis and the water fraction. In some examples, the steam optimization analyzer 114 of the fluid analyzer 108 evaluates the quality of the steam based on the water and steam flow rates and/or phase fractions and can generate one or more instructions to optimize steam flow, as disclosed herein.

In some examples, the flowmeters 1202, 1302 of FIGS. 12 and/or 13 are used with a differential pressure generating device (e.g., a Venturi tube, a flow nozzle, etc.) to generate additional information about the flow properties of the production fluid. For example, the flowmeters 1202, 1302 could be disposed at throat of a Venturi tube. In such examples, the differential pressure generating device is used to generate differential pressure data (e.g., as disclosed in connection with the differential pressure measurement system 406 of FIG. 4). The calculator 112 of the fluid analyzer uses the pressure data to determine the steam mass flow rate. In such examples, the calculator 112 could determine the densities of water and/or vapor steam phases using steam-property reference data based on the line pressure data and line temperature data (e.g., as discussed in connection with FIG. 3) to calculate the water/steam mass flow rate. The differential pressure generating device can be used on examples where small amounts of scattering or no scattering is detected by the light scattering detection sensor(s) 1211 and the steam optimization analyzer 114 of the fluid analyzer 108 determines that the production fluid is only or substantially only steam vapor.

FIG. 14 is a flowchart of an example method 1400 for determining steam quality of a multiphase fluid flow. At block 1402, the light source(s) 1204, 1306, 1314 of FIGS. 12 and/or 13 emit light into a fluid conduit 1203, 1304 at a first absorbing wavelength for liquid water in the fluid (e.g., 1450 nm for water) and a second substantially non-absorbing wavelength for liquid water in the fluid (e.g., 1200 nm). The light source(s) 1204, 1306, 1314 emit the light based on instruction(s) from the sensor operator 117 of the fluid analyzer 108.

At block 1404, the calculator of the fluid analyzer 108 determines water and/or steam fractions based on transmittance data generated by the light detector(s) 1210, 1211, 1312, 1320 of FIGS. 12 and/or 13 in response to the transmission of light through the fluid conduit 1203, 1304. For example, the calculator 112 determines the steam and/or water fractions in the fluid flow based on the transmittance data generated during emission of the first absorbing wavelength, where the transmittance data is corrected based on the transmittance data generated during emission of the second non-absorbing wavelength.

Some examples of the method 1400 of FIG. 14 include determining flow velocities for the water and steam phases in the production fluid (block 1406). In such examples, at block 1408, light is emitted at a non-absorbing wavelength for the fluid across the fluid conduit 1203, 1304 by a first light source 1306 disposed at a first position in the fluid conduit 1304 and by a second light source 1314 disposed at a second position in the fluid conduit 1304. The light source(s) 1306, 1314 emit the light based on instruction(s) from the sensor operator 117 of the fluid analyzer 108.

At block 1410, the calculator 112 of the fluid analyzer 108 performs cross-correlation of the transmitted signal data generated by the light detectors 1312, 1320 in response to emission of light by the respective light sources 1306, 1314.

The calculator 112 analyzes the resulting signal data from the cross-correlation (e.g., transit-time peak analysis) to determine the water and/or steam flow velocities. At block 1412, the calculator 112 determines steam quality, or the mass flow fraction of steam vapor flow relative to the total mass flow rate of the vapor and liquid water based on the flow velocities and phase fractions.

The example multiphase flowmeters 204, 402 of FIGS. 2, 4 and 5 and/or the flowmeters 1202, 1302 of FIGS. 12 and/or 13 can be implemented in a geothermal production system to facilitate optimization of steam production by the system. FIG. 15 illustrates an example system 1500 for monitoring and, in some instances, optimizing geothermal enthalpy production from a geothermal reservoir 1502. The example system 1500 includes a water injection well 1504 and a steam/hot water production well 1506 disposed downhole in the geothermal reservoir 1502. In the example of FIG. 15, the water injection well 1504 is drilled into hot bedrock 1508 of the geothermal reservoir 1502 that has limited permeability and fluid content. Water is injected from the surface into the injection well 1504 via a surface re-injection pump 1510 and a fluid conduit 1511, which causes fracturing in the rock of the reservoir 1502. The surface re-injection pump 1510 can be a reciprocating pump or a centrifugal pump. The injection of water into the injection well 1504 can continue for a period of time to cause the fractures to extend a distance from the injection well 1504 and throughout the reservoir 1502.

The production well 1506 is drilled in the reservoir 1502 at a distance from away from the injection well 1504 to allow the production well 1506 to intersect the stimulated fracture network extending from the injection well 1504. In the example of FIG. 15, water travels from the injection well 1504 through hot rock fractures. The water captures heat from the rocks and travels through the reservoir until the water is forced out into the production well 1506 as hot steam/water. In some examples, a downhole production pump or compressor 1512 is used to transport hot water and steam out of the production well 1506 to the surface.

In the example of FIG. 15, the production fluid output by the production well 1506 is transmitted to a power plant 1514 via a geothermal production pipe 1516. Heat from the steam or hot water in the production fluid is converted into electricity at the power plant 1514. In some examples, the steam or hot water is converted into electricity by a steam turbine.

The example system 1500 of FIG. 15 is a closed loop, as water condensed downstream of the power plant 1514 (e.g., downstream of a system steam turbine) is injected back into the injection well 1504 to be reheated via the downhole hot rock fractures.

The example system 1500 of FIG. 15 includes a first multiphase flow meter (MPFM) 1518 installed downstream of the production well 1506. In some examples, the first MPFM 1518 is substantially the same as the example MPFM 402 of FIG. 4 (e.g., including the differential pressure generating device 405 of the fluid conduit 404, the differential pressure measurement system 406, and the electromagnetic radiation measurement system 414). As shown in FIG. 15, production fluid carried by the production pipe 1516 flows through the first MPFM 1518. In the example of FIG. 15, data generated by the first MPFM 1518 is transmitted to the fluid analyzer 108 via one or more wired or wireless communication protocols. The fluid analyzer 108 processes the data from the first MPFM 1518 to determine, for instance, the individual flow rates of steam and water in the production fluid and enthalpy of the fluid as disclosed in connection with the example algorithm 300 of FIG. 3.

In some examples, a heater 1520 is disposed between the first MPFM 1518 and the power plant 1514 to heat the production fluid as the production fluid flows through the production pipe 1516. The inclusion of the heater 1520 can be based on, for example, a distance of the production well 1506 from the power plant 1514. The heater 1520 heats the production fluid in view of heat loss as the production fluid travels away from the production well 1506. In such examples, a second MPFM 1522 is disposed downstream of the heater 1520. The second MPFM 1522, which can be substantially the same as the MPFM 402 of FIG. 4, generates data that is used by the fluid analyzer 108 to measure properties of the multiphase production fluid after being heated by the heater 1520, such as steam and liquid water flow rates and enthalpy as disclosed in connection with the example algorithm 300 of FIG. 3.

In some examples, the first and/or second MPFMs 1518, 1522 can include the flowmeters 1202, 1302 of FIGS. 12 and/or 13 to measure flow velocities of the liquid water and steam flows based on the transmission of light across the fluid conduit carrying the production fluid.

The example fluid analyzer 108 is communicatively coupled to components of the system 1500 such as the downhole pump/compressor 1512, the heater 1520, and/or the surface re-injection pump 1510 to control, for example, valve(s), pump(s), compressor(s), actuator(s), etc. in response to changes detected based on the data generated by the MPFMs 1518, 1522. The fluid analyzer 108 provides for automated geothermal production management. In some examples, the fluid analyzer 108 is located in a cloud network to provide for wireless management of the geothermal production system 1500.

For example, over time, the water in the injection well 1504 may lose heat energy, which can affect the composition and, thus, steam quality, of the fluid produced from the production well 1506. In particular, the production well 1506 may produce less steam. The change in the composition of the production fluid (e.g., the steam content) is detected by the steam optimization analyzer of the fluid analyzer 108 based on the data generated by the first MPFM 1518.

In the example of FIG. 15, the steam optimization analyzer 114 of the fluid analyzer 108 generates instruction(s) to optimize production of steam based on data generated by the MPFMs 1518, 1522. For example, in response to a decrease in steam content, the steam optimization analyzer 114 can generate instruction(s) for the surface re-injection pump 1510 to lower the water reinjection rate in an effort to optimize steam production. The instruction(s) can be transmitted to the surface re-injection pump 1510 by the communicator 118 of the fluid analyzer 108 and via one or more wired or wireless communication protocols.

In other examples, there may be unexpected cooling due to changes in ambient temperature or the temperature of the production fluid, which can reduce the amount of steam produced. A reduction in steam can cause the power plant 1514 to operate at lower efficiency and potentially damage the turbine. Cooling due to, for example, changes in ambient temperature, is detected by the steam optimization analyzer 114 based on data generated by the second MPFM 1522. In response, the steam optimization analyzer 114 generates instruction(s) for the heater 1520 to adjust the heat transmitted to the production fluid to increase steam content as the production fluid travels through the production pipe 1516. The instruction(s) can be transmitted to the heater

1520 by the communicator 118 of the fluid analyzer 108 and via one or more wired or wireless communication protocols.

As disclosed in connection with the examples of FIGS. 7-11, the fluid conduit analyzer 116 of the fluid analyzer 108 periodically detects changes in the operational condition of the production pipe 1516 based on changes in intensity of electromagnetic radiation signal emissions (e.g., via the radioactive source 500 of FIG. 5) through the production pipe 1516 when the pipe 1516 is empty. In the example of FIG. 15, if the fluid conduit analyzer 116 detects changes in the intensity of the electromagnetic radiation signal emissions based on data generated by the first and/or second MPFMs 1518, 1522 (e.g., the electromagnetic radiation measurement system 414 of the MPFMs), the fluid conduit analyzer 116 determines that there may be scale deposition or damage (e.g., corrosion) to the pipe 1516. In response, the steam optimization analyzer 114 generates instruction(s) for one or more components of the example system 1500 to trigger corrective actions in an effort to reduce damage to the pipe 1516. For example, the steam optimization analyzer 114 can instruct the downhole production pump/compressor 1512 to adjust the fluid flow rate and pressure of the production fluid by, for example, adjusting a voltage, current, and/or supply frequency of the pump/compressor 1512. For instance, adjusting the supply frequency can be used to control the speed of the downhole production pump/compressor 1512 and, thus, the fluid flow rate. In other examples, the fluid property analyzer 108 can instruct the heater 1520 to adjust the heat generated and transmitted to the production fluid, which can affect fluid content. The adjustment of production fluid flow rate, pressure, and/or temperature can be performed to prevent and/or minimize scaling deposition or other damage to the pipe 1516.

In examples where the steam optimization analyzer 114 determines that damage to the pipe 1516 cannot be prevented or reduced by adjustments to the fluid flow and/or the fluid conduit analyzer 116 determines that the damage exceeds a threshold amount, the fluid analyzer 108 can output an alert to a user of the system 1500 (e.g., a power plant operator) to take manual corrective actions such as replacing a portion of the pipeline 1516.

FIG. 16 is a flowchart of an example method 1600 for managing a geothermal production system such as the geothermal production system 1500 of FIG. 15. The example method 1600 can be implemented by the example fluid analyzer 108 of FIGS. 1, 2, 4, and 12.

At block 1602, the calculator 112 of the fluid analyzer 108 determines properties of the production fluid flowing through the production pipe 1516 of the example geothermal production system 1500 based on data obtained from the first MPFM 1518 and/or the second MPFM 1522. For example, the calculator 112 determines enthalpy of the production fluid as disclosed in connection with the algorithm 300 of FIG. 3. In some examples, the calculator 112 determines flow velocities as disclosed in connection with FIG. 14. In some examples, the calculator 112 detects changes in intensity levels of electromagnetic radiation signal(s) (e.g., gamma ray emissions) through the fluid conduit (e.g., the fluid conduit 404 of FIG. 4) with and without fluid flowing therethrough to detect fluid levels in the fluid conduit. In some examples, the calculator 112 detects changes in intensity levels of electromagnetic radiation signal(s) through the empty fluid conduit relative to reference intensity data over time.

At block 1604, the steam optimization analyzer 114 of the fluid analyzer 108 analyzes the properties of the production fluid with respect to, for example, steam content, enthalpy, flow velocities, etc. In some examples, the fluid conduit analyzer 116 of the fluid analyzer 108 analyzes the changes in electromagnetic radiation signal levels through the empty fluid conduit and detects changes in the pipe condition such as scale deposition.

At block 1606, the steam optimization analyzer 114 and/or the fluid conduit analyzer 116 of the fluid analyzer 108 determine whether properties of the production fluid should be adjusted to optimize steam production and/or to prevent or reduce damage to the production pipe. For example, the steam optimization analyzer 114 can generate instructions to affect the behavior of the downhole pump/compressor 1512 of FIG. 15 and/or the heater 1520 of FIG. 15 to affect steam production. In some examples, the steam optimizer analyzer 114 generates instructions to affect the behavior of one or more components of the geothermal production system 1500 and, thus, the properties of the production fluid to reduce damage (e.g., scale deposition) to the production pipe 1516. In some examples, the instruction(s) can include an alert indicating that the production pipe 1516 should be manually repaired.

At block 1608, the communicator 118 of the fluid analyzer 108 transmits the instruction(s) generated by the steam optimization analyzer 114 to the component(s) of the geothermal production system 1500 (e.g., the surface re-injection pump 1510, the downhole pump/compressor 1512, the heater 1520) to adjust the behavior of the system and, thus, the production fluid output.

The flowcharts of FIGS. 3, 6, 11, 14, and/or 16 are representative of example hardware logic, machine readable instructions, hardware implemented state machines, and/or any combination thereof for implementing the fluid analyzer 108 of FIGS. 1, 2, 4, 12, 13, and/or 15. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 3, 6, 11, 14, and/or 16, many other methods of implementing the example fluid analyzer 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 6, 11, 14, and/or 16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 17 is a block diagram of an example processor platform 1700 structured to execute the instructions of FIGS. 3, 6, 11, 14, and/or 16 to implement the example fluid analyzer 108 of FIGS. 3, 6, 11, 14, and/or 16. The processor platform 1700 can be, for example, a server, a personal computer, a workstation, an edge computing device, a cloud computing platform, a self-learning machine (e.g., a neural network), a mobile device (e.g., a cell phone, a smart phone, a tablet such as an iPad™), a personal digital assistant (PDA), an Internet appliance, Industrial Internet of Things (IIoT), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, FPGAs, GPUs, DSPs, or controllers from any desired family or manufacturer. The hardware processor may be a semiconductor based (e.g., silicon based) device. In this example, the processor implements the example calculator 112, the example steam optimization analyzer 114, the example fluid conduit analyzer 116, the example sensor operator 117, and the example communicator 118.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

Coded instructions 1732 of FIG. 17 may be stored in the mass storage device 1728, in the volatile memory 1714, in the non-volatile memory 1716, and/or on a removable non-transitory computer readable storage medium such as a CD or DVD.

From the foregoing, it will be appreciated that the above-disclosed apparatus, systems, and methods provide for monitoring, evaluation, and control of steam production in a geothermal production system. Example flowmeters disclosed herein provide for monitoring of a variety of the properties of production fluid, such as liquid water and steam flow rates, phase fractions, enthalpy of the fluid, steam quality, etc. Rather than collecting samples and analyzing the samples offsite, examples disclosed here enable production fluid to be analyzed in-line and substantially in real time using flowmeters that are integrated with the production pipeline. Some example flowmeters disclosed herein provide for monitoring of operational conditions a production pipe carrying the fluid and, thus, provide for more efficient detection of damage to the pipes. Examples disclosed herein can be implemented in a geothermal production system to provide for automated control and optimization of steam production based on data generated by the flowmeters. Thus, examples disclosed herein provide for efficient management of geothermal production systems. Example geothermal production monitoring systems disclosed herein can include processing mechanism(s) housed in centralized cloud computing server(s) or in distributed edge computing device(s) disposed in proximity to production equipment (e.g., valve(s), pump(s), compressor(s), etc.) that is to be actuated and/or controlled via actuator(s) in response to changes in geothermal production measurement output data. The use of rapid-response edge computing devices can provide for substantially real-time steam production optimization. Data from multiple MPFMs installed in a geothermal field can be transmitted via wired or wireless channels to one or more geothermal production systems for processing using data analytic algorithm(s). Examples disclosed herein provide actionable insights with respect to production and prognostic health management (PHM) of geothermal field(s).

In the specification and appended claims: the term "coupled" is used to mean "directly coupled together" or "coupled together via one or more elements." "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The following paragraphs provide various examples of the examples disclosed herein.

Example 1 includes a system including a production well, an injection well, a downhole pump or a downhole compressor to control a production of a multiphase fluid including steam from the production well, a first fluid conduit to transport the multiphase fluid away from the production well, a surface pump disposed downstream of the first fluid conduit, and a second fluid conduit. The surface pump is to inject water into the injection well via the second fluid conduit. A flowmeter is fluidly coupled to the first fluid conduit. The example system includes a processor to control at least one of (a) the downhole pump or the downhole compressor or (b) the surface pump in response to fluid property data generated by the first flowmeter.

Example 2 includes the system of example 1, further including a heater coupled to the first fluid conduit.

Example 3 includes the system of example 2, wherein the flowmeter includes a first flowmeter and a second flowmeter, the multiphase fluid to flow through the second flowmeter after exposure to the heater, the processor to adjust an amount of heat generated by the heater in response to one or more of the fluid property data generated by the first flowmeter or in response to fluid property data generated by the second flowmeter.

Example 4 includes the system of example 1, wherein the flowmeter includes a radioactive source and a radioactive photon signal detector, the radioactive source to emit a radioactive photon signal through the first fluid conduit, the processor to determine an operational condition of the first fluid conduit based on an intensity of the radioactive photon signal detected by the radioactive photon signal detector.

Example 5 includes the system of example 4, wherein the operational condition of the first fluid conduit is indicative of scale deposition in the first fluid conduit or corrosion of the first fluid conduit.

Example 6 includes the system of example 1, wherein the processor is to determine one or more of a flow rate of the steam in the multiphase fluid, a flow rate of liquid water in the multiphase fluid, a steam quality of the multiphase fluid, or an enthalpy of the multiphase fluid based on the fluid property data.

Example 7 includes a method including determining, by executing an instruction with a processor, a property of steam in a multiphase production fluid flowing through a fluid conduit based on a sensor data generated by a flowmeter coupled to the fluid conduit, the production fluid to be generated via a production well including at least one of a downhole pump or a downhole compressor; determining, by executing an instruction with a processor, a command for at least one of a downhole pump or a downhole compressor or (b) a surface pump in response to the property of the steam; and transmitting, by executing an instruction with the processor, the command to the at least one of (a) the downhole pump or the downhole compressor or (b) the surface pump to cause an adjustment to the property of the steam.

Example 8 includes the method of example 7, wherein the property includes one or more of a flow rate of the steam in the multiphase fluid, or a steam quality of the multiphase fluid, or an enthalpy of the multiphase fluid based on the sensor data.

Example 9 includes the method of examples 7 or 8, wherein the sensor data includes an intensity measurement of an electromagnetic radiation signal emitted through the fluid conduit and further including determining an operational condition of the fluid conduit based on the intensity measurement.

Example 10 includes the method of example 9, wherein the command is a first command and further including determining a second command for the at least one of (a) the downhole pump or the downhole compressor or (b) the surface pump, the second command to cause an adjustment to a flow of the multiphase production fluid in response to the operational condition of the fluid conduit.

Example 11 includes the method of any of examples 7-9, wherein the command is a first command and further including generating a second command for a heater, the second command to cause an adjustment to an amount of heat generated by the heater, the multiphase production heater to be exposed to the heater via the fluid conduit.

Example 12 includes an apparatus including a flowmeter includes a first pressure sensor disposed at a first location along a fluid conduit; a second pressure sensor disposed at a second location along the fluid conduit; a temperature sensor disposed at a third location along the fluid conduit; a radioactive source coupled to the fluid conduit to emit an electromagnetic radiation signal; and a detector coupled to the fluid conduit to detect the transmitted radioactive photon signal and to generate signal detection data based on the detection. The example apparatus includes a processor to determine a property of a multiphase fluid flowing in the conduit based on pressure data generated by the first pressure sensor, pressure data generated by the second pressure sensor, temperature data generated by the temperature sensor, and the signal detection data generated by the detector.

Example 13 includes the apparatus of example 12, wherein the property includes an enthalpy of the multiphase fluid.

Example 14 includes the apparatus of examples 12 or 13, wherein the property includes a flow rate of liquid water in the multiphase fluid and a flow rate of the steam in the multiphase fluid.

Example 15 includes the apparatus of example 12, wherein the processor is to determine an operational condition of the fluid conduit based on the signal detection data generated by the detector.

Example 16 includes the apparatus of example 12, wherein the processor is to determine a volume fraction of fluid in the fluid conduit based on the signal detection data.

Example 17 includes the apparatus of any of example 12-16, wherein the fluid conduit includes a differential pressure generating device, the first pressure sensor disposed upstream of the differential pressure generating device and the second pressure sensor disposed at a throat region of the differential pressure generating device or downstream of the differential pressure generating device.

Example 18 includes the apparatus of example 17, wherein the differential pressure generating device includes a Venturi tube or a flow nozzle.

Example 19 includes the apparatus of example 17, wherein the radioactive source and the detector are disposed upstream of the differential pressure generating device, at a throat region of the differential pressure generating device, or downstream of the differential pressure generating device.

Example 20 includes the apparatus of example 19, wherein the radioactive source and the detector is disposed downstream of the second pressure sensor.

Example 21 includes an apparatus including a flowmeter including a fluid conduit and a first light source to emit a first light at a first wavelength and a second light at a second wavelength. The first light and the second light are to pass through the fluid conduit. The example apparatus includes a first light detector to (a) detect the first light passing through the fluid conduit and generate first transmittance data in response to the detection of the first light and (b) detect the second light passing through the fluid conduit and generate second transmittance data in response to the detection of the second light. The example apparatus includes a processor to determine a water fraction of water in a steam flow flowing through the fluid conduit based on the first transmittance data and the second transmittance data.

Example 22 includes the apparatus of example 21, wherein the first wavelength is an absorption wavelength for liquid water in the fluid and the second wavelength is a substantially non-absorption wavelength for the liquid water in the fluid.

Example 23 includes the apparatus of example 21, wherein the flowmeter includes a second light source and a second light detector, the second light to emit a third light, the second light detector to generate third transmittance data in response to detection of the third light, and the processor is to determine a velocity of the steam flow based on the third transmittance data and one of the first transmittance data or the second transmittance data.

Example 24 includes the apparatus of example 23, wherein the processor is to determine velocity by performing a cross-correlation of the third transmittance data and the one of the first transmittance data or the second transmittance data.

Example 25 includes the apparatus of any of examples 21-24, further including a pressure generating device disposed in the fluid conduit; a first pressure sensor to generate first pressure data for the steam flow; and a second pressure sensor to generate second pressure data for the steam flow. The processor is to determine a steam mass flow rate based on a difference between the first pressure data and the second pressure data and a density of steam.

Example 26 incudes the apparatus of any of example 21-24, wherein the fluid conduit includes a first optical window and a second optical window defined therein, the light to pass from the first light source to the first light detector through the first optical window and the second optical window.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein.

Those skilled in the art should also realize that such equivalent constructions do not depart from the spirit and scope of the present disclosure, and that they may make various changes, substitutions and alterations herein without departing from the spirit and scope of the present disclosure.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The following claims are hereby incorporated into this Detailed Description by this reference, with each claim standing on its own as a separate embodiment of the present disclosure.

The invention claimed is:

1. A method comprising:

determining, by executing an instruction with a processor, a property of steam in a multiphase production fluid flowing through a fluid conduit based on sensor data generated by a flowmeter coupled to the fluid conduit and at least one thermodynamic model stored in a database, the at least one thermodynamic model including reference data for correlating the sensor data to the property of the steam, the reference data including thermodynamic properties of the steam and water as a function of pressure and temperature and/or fluids calibration data for the flowmeter, the reference data being defined by one or more user inputs, the production fluid to be generated via a production well including at least one of a downhole pump or a downhole compressor, wherein the sensor data is generated at in-line conditions in the fluid conduit and includes pressure data generated via a first pressure sensor of the flowmeter positioned at a first location along the fluid conduit, pressure data generated via a second pressure sensor of the flowmeter positioned at a second location along the fluid conduit, temperature data generated via a temperature sensor of the flowmeter, and signal data generated via a phase fraction sensor of the flowmeter indicative of phase fractions of the steam and a liquid phase of the production fluid;

determining, by executing an instruction with the processor, that the property of the steam in the multiphase production fluid is indicative of non-optimal production of the steam;

determining, by executing an instruction with the processor, a command for at least one of (a) the downhole pump or the downhole compressor or (b) a surface pump in response to the determination that the property of the steam is indicative of the non-optimal production of the steam; and transmitting, by executing an instruction with the processor, the command to the at least one of (a) the downhole pump or the downhole compressor or (b) the surface pump to increase production of the steam.

2. The method of claim 1, wherein the property of the steam includes one or more of a flow rate of the steam in the multiphase fluid or a steam quality of the multiphase fluid, or an enthalpy of the multiphase fluid based on the sensor data.

3. The method of claim 1, wherein the sensor data includes an intensity measurement of an electromagnetic radiation signal emitted through the fluid conduit and further including determining an operational condition of the fluid conduit based on the intensity measurement.

4. The method of claim 3, wherein the command is a first command, and the method further comprises:

determining that the operational condition of the fluid conduit is indicative of scale deposition or damage to the fluid conduit; and determining a second command for the at least one of (a) the downhole pump or the downhole compressor or (b) the surface pump, the second command to cause an adjustment to a flow of the multiphase production fluid in response to the determination that the operational condition of the fluid conduit is indicative of scale deposition or damage to the fluid conduit.

5. The method of claim 1, wherein the command is a first command and further including generating a second command for a heater, the second command to cause an adjustment to an amount of heat generated by the heater, the multiphase production fluid to be exposed to the heater via the fluid conduit.

* * * * *